United States Patent
Iwata et al.

(10) Patent No.: US 8,208,214 B2
(45) Date of Patent: Jun. 26, 2012

(54) MAGNETIC SENSOR DEVICE HAVING NEAR FIELD LIGHT GENERATION SECTION EMPLOYING A DIELECTRIC LAYER BETWEEN A PROTRUDING METAL LAYER AND MAGNETIC LAYER

(75) Inventors: Noboru Iwata, Kashiba (JP); Shintaro Miyanishi, Nara (JP); Tomoki Ono, Tokyo (JP); Yoshiteru Murakami, Nishinomiya (JP)

(73) Assignee: Sharp Kabushiki Kaisha, Osaka (JP)

( * ) Notice: Subject to any disclaimer, the term of this patent is extended or adjusted under 35 U.S.C. 154(b) by 687 days.

(21) Appl. No.: 12/225,901

(22) PCT Filed: Mar. 27, 2007

(86) PCT No.: PCT/JP2007/056295
§ 371 (c)(1),
(2), (4) Date: Mar. 30, 2009

(87) PCT Pub. No.: WO2007/119519
PCT Pub. Date: Oct. 25, 2007

(65) Prior Publication Data
US 2009/0219638 A1 Sep. 3, 2009

(30) Foreign Application Priority Data
Apr. 13, 2006 (JP) .................. 2006-111369

(51) Int. Cl.
*G11B 5/02* (2006.01)
(52) U.S. Cl. ............ 360/59; 360/125.31; 360/125.74; 360/128; 360/317

(58) Field of Classification Search .......... 360/313–328, 360/59, 125.31, 125.74, 128; 257/421–427; 324/244–263; 365/145, 158, 171–173; 428/810–816
See application file for complete search history.

(56) References Cited

U.S. PATENT DOCUMENTS
6,687,195 B2 2/2004 Miyanishi et al.
(Continued)

FOREIGN PATENT DOCUMENTS
JP 2002-251807 A 9/2002
(Continued)

*Primary Examiner* — Allen Heinz
(74) *Attorney, Agent, or Firm* — Edwards Wildman Palmer LLP; David G. Conlin; David A. Tucker

(57) ABSTRACT

A magnetic sensing section is constituted by a magnetoresistive device in which a fixed magnetization layer, a nonmagnetic layer, and a magnetization-free layer are deposited in that order on a first buffer layer that is deposited on a magnetic layer. A second buffer layer sandwiches the magnetic sensing section, and a biasing layer which covers right and left sides of the magnetic sensing section. The second buffer layer is deposited on the magnetic layer with a nonconductor layer interposed therebetween. A near field light generation section constituted by a second magnetic layer, a dielectric layer, and a metal layer is formed on a surface of the second buffer layer not adjacent to the nonconductor layer. The resultant magnetic sensor device can efficiently perform photo-assisted reproduction of information from a magnetic recording medium using a magnetic reproduction head or a magnetic reproducer.

11 Claims, 30 Drawing Sheets

U.S. PATENT DOCUMENTS

| | | |
|---|---|---|
| 6,795,380 B2 * | 9/2004 | Akiyama et al. ............ 369/13.33 |
| 6,956,808 B2 | 10/2005 | Miyanishi et al. |
| 6,982,844 B2 * | 1/2006 | Rettner et al. ................... 360/59 |
| 7,027,700 B2 * | 4/2006 | Challener ..................... 385/129 |
| 7,106,935 B2 * | 9/2006 | Challener ..................... 385/129 |
| 7,307,923 B2 | 12/2007 | Miyanishi et al. |
| 7,649,677 B2 * | 1/2010 | Jin et al. ......................... 359/325 |
| 7,690,009 B2 * | 3/2010 | Miyanishi et al. ............. 720/658 |
| 7,898,909 B2 * | 3/2011 | Shimazawa et al. ....... 369/13.33 |
| 2004/0085862 A1 | 5/2004 | Matsumoto et al. |
| 2006/0075417 A1 | 4/2006 | Miyanishi et al. |
| 2009/0168220 A1 * | 7/2009 | Komura et al. ................. 360/59 |

FOREIGN PATENT DOCUMENTS

| | | |
|---|---|---|
| JP | 2003-6803 A | 1/2003 |
| JP | 2003-203304 A | 7/2003 |
| JP | 2004-151046 A | 5/2004 |
| JP | 2004-303299 A | 10/2004 |
| JP | 2005-004901 A | 1/2005 |
| JP | 2006-114099 A | 4/2006 |
| JP | 2006-120294 A | 5/2006 |
| JP | 2007-129196 A | 5/2007 |
| JP | 2007-157325 A | 6/2007 |

* cited by examiner

FIG.2
(a)
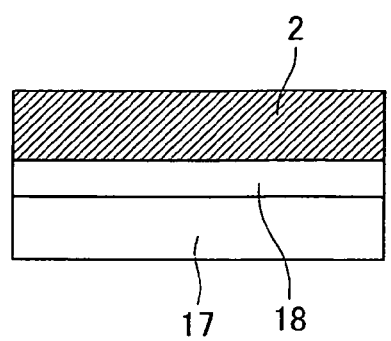
(b)
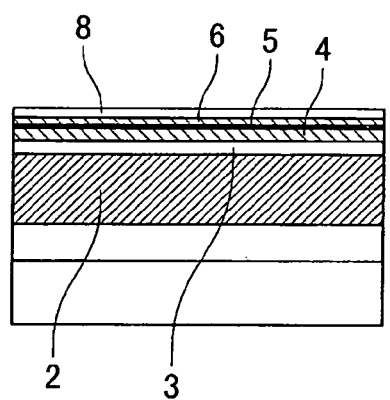
(c)
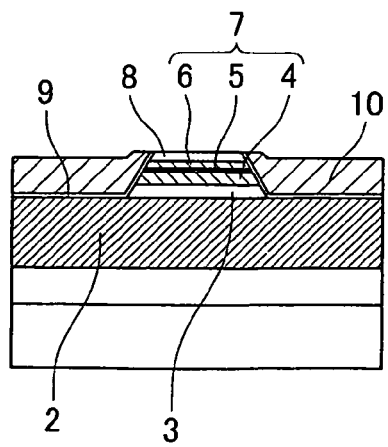
(d)
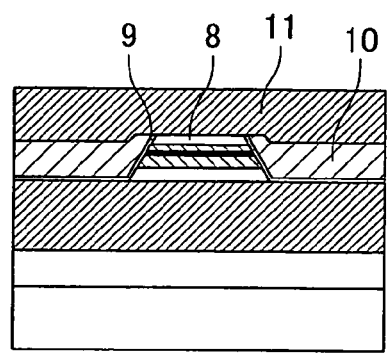
(e)
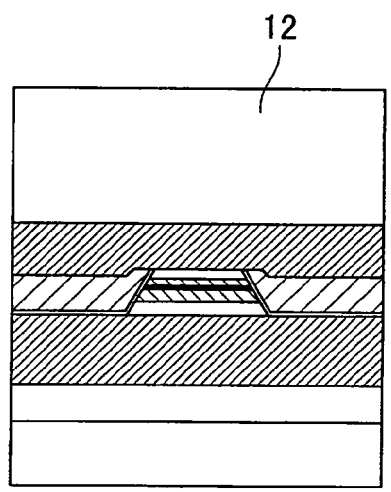
(f)
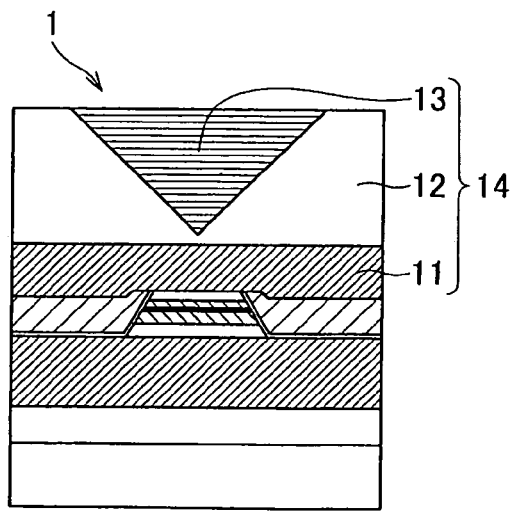

FIG.7
(a)
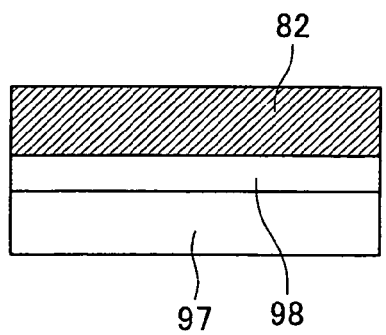
(b)
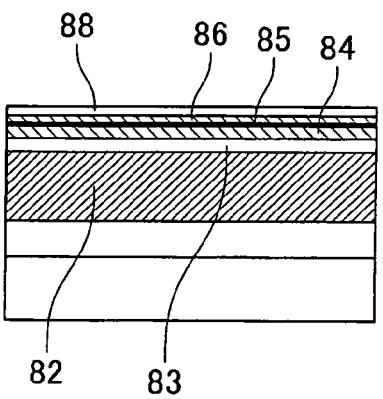
(c)
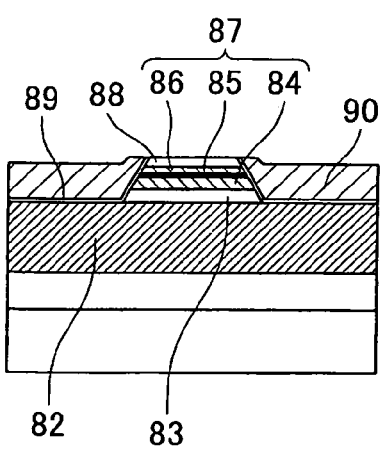
(d)
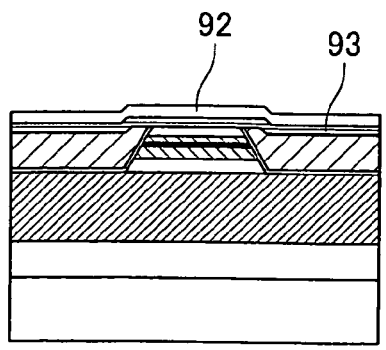
(e)
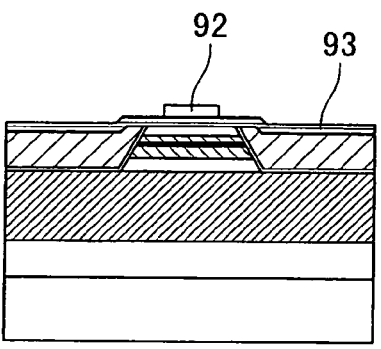
(f)
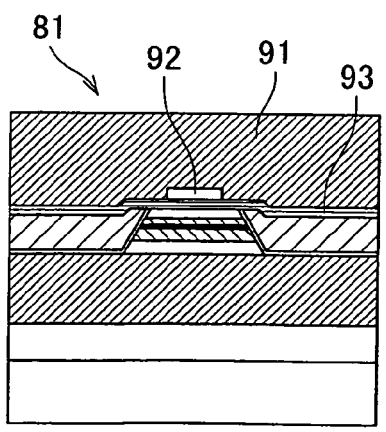

MAGNETIC SENSOR DEVICE HAVING NEAR FIELD LIGHT GENERATION SECTION EMPLOYING A DIELECTRIC LAYER BETWEEN A PROTRUDING METAL LAYER AND MAGNETIC LAYER

TECHNICAL FIELD

The present invention relates to a magnetic sensor device used for a photo-assisted magnetic reproduction method by which recorded information recorded on a magnetic recording medium is reproduced while the temperature of a magnetic recording medium is increased using near field light, a magnetic reproduction head and a magnetic reproducer each including the magnetic sensor device, and a magnetic reproduction method for a magnetic recording medium using the magnetic reproducer.

BACKGROUND ART

In the field of magnetic recording typically used for hard discs, recording density of 200 Gbit/inch$^2$ or higher in areal density has been achieved thanks to the improvement in characteristics of recording media, recording heads, and reproducing heads, and the density is improving even more. In response to this improvement in recording density, various magnetic recording methods and magnetic reproduction methods have been proposed.

As one of magnetic recording methods adopted in current models of hard discs, a photo-assist reproduction method has been proposed with the view to reading out, in high resolution, magnetically-recorded information which is recorded on a magnetic recording medium at high density. This reproduction method is arranged in such a way that laser light is applied to a magnetic recording medium which records magnetically-recorded information thereon so that the magnetic recording medium is locally heated to a temperature lower than the temperature in the recording, and a leakage magnetic field generated from the heated area is detected by using a magnetic sensor. In adopting this method, the material and composition of the recording medium are adjusted in advance so that a non-heated area of the magnetic recording medium rarely generates a leakage magnetic field whereas a heated area of the magnetic recording medium generates an intense leakage magnetic field. This allows the magnetic sensor to detect a relatively strong leakage magnetic field from the heated area, thereby making it possible to restrain crosstalk from neighboring tracks. In this photo-assisted reproduction, an area from which information is reproduced (i.e. an area generating an intense leakage magnetic field) is determined in accordance with the size of a heated area on the recording medium. It is therefore possible to reproduce information in high resolution from microscopic recording bits, when the size of the heated area is reduced by adopting a near field light source as the heat source.

An example of the aforesaid scheme adopting a near field light source and a magnetic sensor is a below-described patent document 1. This patent document 1 discloses a photo-assisted magnetic head including: a coil which applies a magnetic field to around a laser light emission opening so that information is recorded; and a magnetic sensor which is placed inside the coil and detects information recorded on a magnetic recording medium. This document also discloses a photo-assisted magnetic head including either a plasmon exciting member which enhances laser light emitted from the laser light emission opening or a light-blocking member which is capable of reducing the size of the opening. The patent document 1 also teaches that the invention makes it possible to shorten the distance between the laser light emission opening and a spin valve film of a magneto-resistive device used in the magnetic sensor to be 2-3 μm and hence adjustments during construction become easy, thereby allowing the laser light emission opening and the magnetic sensor to simultaneously track a single narrow track.

[Patent Document 1] Japanese Unexamined Patent Publication No. 2003-203304

DISCLOSURE OF THE INVENTION

Problems to be Solved by the Invention

A magnetic sensor used in a current model of hard disc typically includes a magnetic sensing section which is typified by a magneto-resistive device and magnetic shields which are formed on the both surfaces of the magnetic sensing section (in the direction along the track of the magnetic recording medium) and each of which is about 500 nm through 3 μm thick. In the meanwhile, the range of the near field light emitted from the near field light source is as large as or not larger than the size of a microscopic area where near field light is generated. If a known near field light source is used for photo-assisted reproduction, a magnetic shield which is about 500 nm through 3 μm thick and used in a known magnetic sensor is too thick and hence the distance between the near field light source and the magnetic sensing section is too far. This is disadvantageous in that a heated area of the magnetic recording medium, which is heated by the near field light source, is naturally cooled down as the medium moves, before reaching the position below the magnetic sensing section, with the result that photo-assisted reproduction is not attained. In regard to photo-assisted reproduction using a near field light source, no one has pointed out the aforesaid disadvantage that conventional magnetic shield thickness causes a heated area to be naturally cooled down before reaching the position below the magnetic sensing section. As a matter of course a solution to the disadvantages has not been proposed.

In addition the above, although the patent document 1 discloses a photo-assisted magnetic head which can reduce the distance between the laser light emission opening and the spin valve film of the magneto-resistive sensor, the reduced distance between the laser light emission opening and the spin valve film is 2-3 μm. This distance is significantly longer than the range of near field light and hence not appropriate for photo-assisted reproduction. Consequently this arrangement involves a problem in efficiency.

In consideration of the above, an object of the present invention is to provide a magnetic sensor device, a magnetic reproduction head, and a magnetic reproducer, which can efficiently perform photo-assisted reproduction of information from a magnetic recording medium, and to provide a magnetic reproduction method of a magnetic recording medium, which adopts such a magnetic reproducer.

Means for Solving the Problems and Advantageous Effects (1) A magnetic sensor device of the present invention comprises: a near field light generation section in which a dielectric layer and a first metal layer are deposited in this order on a magnetic layer; and a magnetic sensing section which is formed outside the magnetic layer or outside the first metal layer of the near field light generation section.

In the magnetic sensor device of (1), the magnetic layer is able to function as both a magnetic shield of the magnetic sensing section and a component which generates and enhances near field light. This makes it possible to achieve both of the following effects: a part where near field is generated is provided to be very close to the magnetic sensing section; and enhanced near field light with high intensity is applied to a magnetic recording medium. Since the near field light generation section is provided to be very close to the magnetic sensing section, it is possible to very efficiently restrain the natural cooling of the heated area of the magnetic recording medium, which area is heated by the near field light. This makes it possible to achieve efficient photo-assisted reproduction.

In addition to the above, the power consumption of the laser light source is restrained because it is unnecessary to heat the magnetic recording medium to a very high temperature. In addition to the above, photo-assisted reproduction with high resolution is realized because the heated area of the magnetic recording medium is small. In addition to the above, greater design freedom is attained because it is no longer the case that information in a magnetic recording medium is mistakenly erased at the time of photo-assisted reproduction. This permits the hybridization with a recording device. Furthermore, since enhanced highly intense near field light is applied to a magnetic recording medium, it is possible to obtain highly intense near field light even if applied light from a laser light source has low power. The decrease in the power consumption of the laser light source is further ensured for this reason. In addition to the above, a magnetic sensor device with high magnetic field detection capability is realized because as described above the intensity of irradiating laser light is reducible and hence the magnetic sensing section is not excessively heated.

Furthermore, since the magnetic layer is a part of the near field light generation section and at the same time functions as a magnetic shield, the number of components is small as compared to a case where a member functioning as a magnetic shield and a member for generating and enhancing near field light are separately formed. In addition to the above, since the magnetic sensing section and the near field light generation section are successively formed on the same substrate by the thin film formation method, it is possible to realize a magnetic sensor device which is manufactured at low cost, is small in size, is light in weight, and can be easily hybridized with a recording device.

Furthermore, when the magnetic sensing section is provided outside the first metal layer of the near field light generation section, an area where near field light is generated is provided between the magnetic layer functioning as a magnetic shield and the magnetic sensing section. This allows near field light to be generated from an area further close to the magnetic sensing section, and hence near-field photo-assisted reproduction with extremely high efficiency is realized. When the magnetic sensing section is provided on the first metal layer side of the near field light generation section, the source of near field light is not distanced from the magnetic sensing section even if the magnetic layer is thick. It is therefore possible to provide a magnetic sensor device which can highly effectively cancel out a leakage magnetic field generated from a neighboring bit and an external stray magnetic field, which are sources of noise at the time of reproduction of a magnetic signal.

(2) The magnetic sensor device of (1) is preferably arranged so that the first metal layer has a protruding section which protrudes toward the magnetic layer.

(3) The magnetic sensor device of (2) is preferably arranged so that a distance between the magnetic layer and a tip of the protruding section of the first metal layer is not shorter than 5 nm and not longer than 100 nm.

(4) In another aspect, the magnetic sensor device of (2) is preferably arranged so that a distance between the magnetic layer and a tip of the protruding section of the first metal layer is not shorter than 15 nm and not longer than 50 nm.

According to (2) to (4) above, near field light is locally generated at around the tip of the protruding section of the metal layer in response to the application of the light beam, and the near field light is enhanced by the resonance (multiple interference) between surface plasmons generated at the interface between the dielectric layer and the metal layer and surface plasmons generated at the interface between the magnetic layer and the dielectric layer. For this reason a magnetic recording medium is efficiently heated. This realizes a magnetic sensor device which can perform photo-assisted reproduction with high reproduction resolution.

(5) The magnetic sensor device of (2) to (4) is preferably arranged so that the magnetic layer has a concave shaped along the shape of the protruding section of the first metal layer.

According to (5) above, it is possible to prevent laser light from passing through the near field light generating surface of the magnetic sensor device. In addition, near field light which is smaller in size is obtained because an electric field is contained between the magnetic layer and the metal layer. Therefore the size of a heated area on the magnetic recording medium is further reduced and hence photo-assisted reproduction with higher resolution is realized. Furthermore, the magnetic layer functioning as a magnetic shield is thick except at the protruding section of the first metal layer. It is therefore possible to provide a magnetic sensor device which can highly effectively cancel out a leakage magnetic field generated from a neighboring bit and an external stray magnetic field, which are sources of noise.

(6) The magnetic sensor device of (2) is preferably arranged so that a second metal layer is formed between the magnetic layer and the dielectric layer.

(7) The magnetic sensor device of (6) is preferably arranged so that a distance between the second metal layer and a tip of the protruding section of the first metal layer is not shorter than 2 nm and not longer than 100 nm.

(8) The magnetic sensor device of (6) is preferably arranged so that a distance between the second metal layer and a tip of the protruding section of the first metal layer is not shorter than 15 nm and not longer than 70 nm.

(9) The magnetic sensor device of (6) is preferably arranged so that the second metal layer is not less than 2 nm thick and not more than 100 nm thick.

In the magnetic sensor device of (6) to (9), since the effect of multiple interference of electric fields between the second metal layer formed in contact with the magnetic layer and the protruding section of the first metal layer is strong, highly-intense near field light is obtained and a magnetic sensor device which can heat a magnetic recording medium further efficiently is realized. Furthermore, since highly-intense near field light is obtained even if the irradiated light beam has low intensity, the power consumption of the laser light source is further reduced. In addition to the above, a magnetic sensor device with high magnetic field detection capability is realized because as described above the intensity of irradiating laser light is reducible and hence the magnetic sensing section is not excessively heated.

(10) Preferably the magnetic sensor device of (1) further comprises a second metal layer which is provided between the magnetic layer and the first metal layer and has a groove on a surface on the first metal layer side, the groove being entirely filled by the dielectric layer.

(11) The magnetic sensor device of (1) or (2) is preferably arranged so that a groove is formed on a surface of the magnetic layer which surface is on the first metal layer side, and the groove is entirely filled by the dielectric layer.

(12) In another aspect, the magnetic reproduction head of (1) or (2) is preferably arranged so that a groove is formed on a surface of the first metal layer which surface is on the magnetic layer side, and the groove is entirely filled by the dielectric layer.

(13) Alternatively, the magnetic sensor device of (10) is preferably arranged so that the dielectric layer is not less than 5 nm thick and not more than 20 nm thick, and is not less than 50 nm wide and not more than 100 nm wide along a surface.

(14) Alternatively, the magnetic sensor device of (10) is preferably arranged so that the first metal layer is not less than 8 nm and not more than 100 nm at a thinnest part.

According to (10) to (14) above, near field light is obtained from an area whose size is more or less identical with the size of the dielectric layer. This makes it possible to control the size of generated near field light by controlling the size of the dielectric layer. According to (10), furthermore, since the dielectric layer is enclosed between the first metal layer and the second metal layer, near field light is further enhanced by multiple interference between the first and second metal layers and the magnetic layer, and a magnetic sensor device which can realize photo-assisted reproduction with high reproduction resolution is provided. According to (11) to (14), furthermore, since near field light is enhanced by multiple interference between the magnetic layer and the first metal layer, a magnetic recording medium is efficiently heated and a magnetic sensor device which can realize photo-assisted reproduction with high reproduction resolution is provided.

(15) The magnetic sensor device of (10) is preferably arranged so that a second metal layer is formed between the magnetic layer and the dielectric layer. Since this makes it possible to achieve a high multiple interference effect of the electric field as compared to the magnetic sensor devices of (11) to (14), it is possible to obtain near field light having higher intensity than those of the magnetic sensor devices of (11) to (14), and it is possible to provide a magnetic sensor device which can further efficiently heat a magnetic recording medium.

(16) The magnetic sensor device of (1) to (4) is preferably arranged so that the first metal layer is made of Au, Ag, Al, or an alloy mainly of at least one of Au, Ag, and Al.

(17) The magnetic sensor device of (6) or (15) is preferably arranged so that the first metal layer and the second metal layer are made of Au, Ag, Al, or an alloy mainly of at least one of Au, Ag, and Al.

According to (16) or (17), near field light with significantly high intensity is obtained, and it is possible to realize a magnetic sensor device which can extremely efficiently heat a magnetic recording medium.

(18) A magnetic reproduction head of the present invention comprises a substrate having a surface on which the magnetic sensor device of (1) to (4) is formed; and an ABS section which is formed on a surface of the magnetic sensor device from which surface near field light is emitted. This allows the magnetic sensor device of (1) to (4) to be adopted in a magnetic reproduction head with the use of the substrate as a slider, and makes it possible to provide a magnetic reproduction head for photo-assisted reproduction, which can be manufactured by a simple process, light in weight, and in which a magnetic sensor is highly precisely aligned with a slider.

(19) The magnetic reproduction head of (18) is preferably arranged so that, in the magnetic sensor device, a laser light source which is provided to generate the near field light is formed on the substrate. This makes it possible to realize a magnetic reproduction head in which a magnetic sensor device is integrated with a laser light source. Therefore highly precise photo-assisted reproduction is realized on account of extremely high precision of alignment of light beam with respect to the magnetic sensor, and a very small magnetic reproduction head for photo-assisted reproduction is realized.

(20) The magnetic reproduction head of (18) is preferably arranged so that, at a part of an optical axis of a light beam applied to the magnetic sensor device on the substrate, a light-blocking member is provided to prevent the light beam from being applied to a magnetic sensing section of the magnetic sensor device. This restrains a temperature increase of the magnetic sensing section and allows light beam to be applied only to around the near field light source. It is therefore possible to realize efficient photo-assisted reproduction using near field light, without impairing the magnetic field detection capability of the magnetic sensing section.

(21) A magnetic reproducer of the present invention comprises the ωmagnetic reproducer magnetic reproduction head of (18) and a magnetic recording medium from which magnetic reproduction is performed by the magnetic reproduction head. This makes it possible to realize a magnetic reproducer which can exert the effects of the aforesaid magnetic reproduction head and can perform efficient photo-assisted reproduction.

(22) The magnetic reproducer of (21) is preferably arranged so that the magnetic sensor device in the magnetic reproduction head is provided, in relation to a direction of movement of the magnetic recording medium, behind a part of the magnetic reproduction head from which part near field light is generated. This allows the heated area of the magnetic recording medium to efficiently move to the point immediately below the magnetic sensing section, and hence a magnetic reproducer which can realize efficient photo-assisted reproduction is provided.

(23) A magnetic reproduction method of the present invention using the magnetic reproducer of (21) comprises the steps of: emitting near field light from the magnetic sensor device of the magnetic reproduction head; forming a heated area on the magnetic recording medium by the near field light; and detecting, by using the magnetic sensing section in the magnetic sensor device, a magnetic field generated from the heated area. This makes it possible to realize highly precise and efficient photo-assisted reproduction by using the magnetic reproducer of (21).

BRIEF DESCRIPTION OF THE DRAWINGS

FIG. 2 illustrates the manufacturing steps of the magnetic sensor device shown in FIG. 1 in order.

FIG. 7 shows manufacturing steps of the magnetic sensor device of FIG. 6 in order.

BEST MODE FOR CARRYING OUT THE INVENTION

First Embodiment

Figure 1:
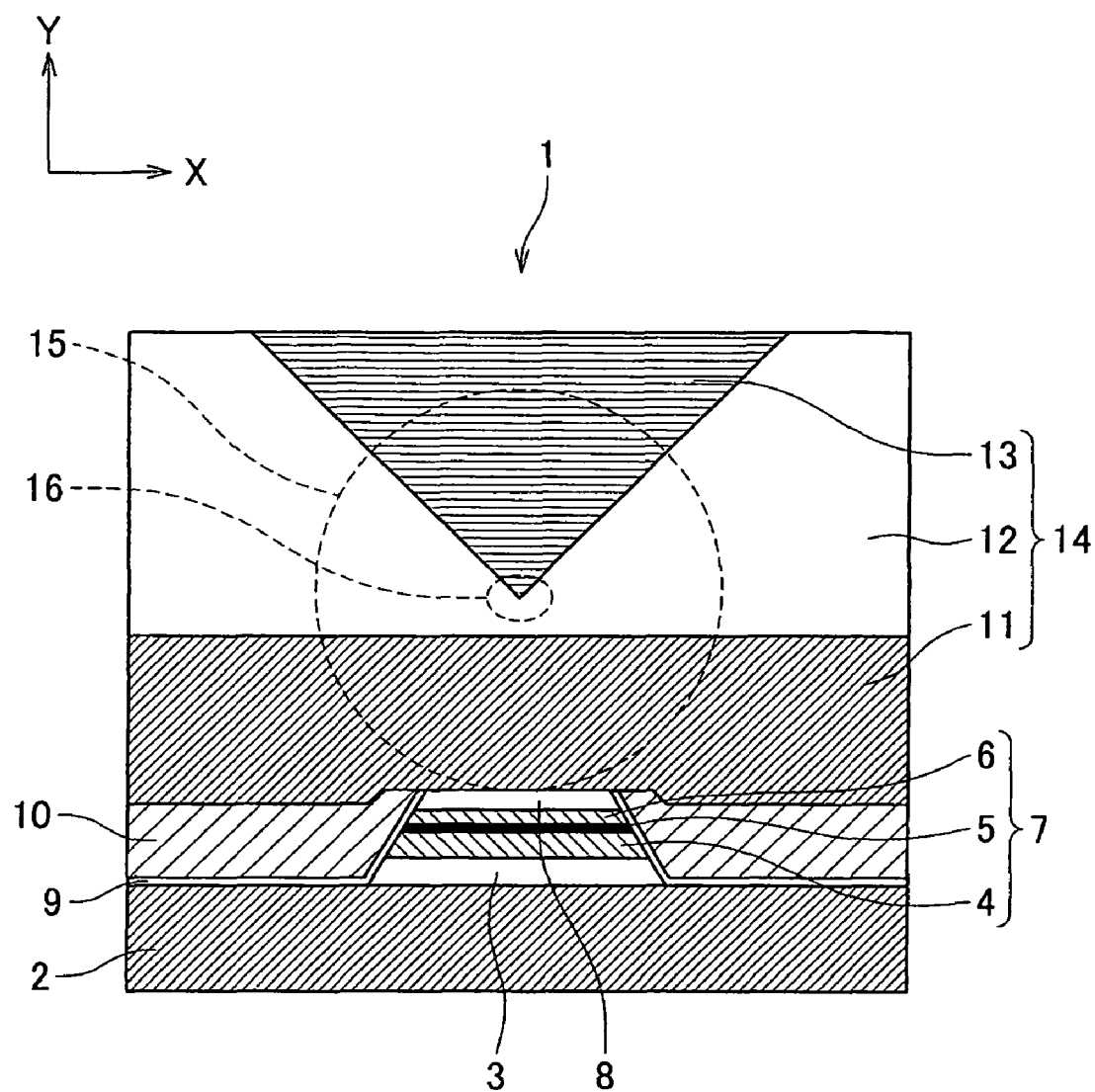
FIG. 1 is a partly-enlarged plan view of a substantial part of the magnetic sensor device of the first embodiment of the present invention, viewed from the surface opposing a magnetic recording medium.

The following describes a magnetic sensor device of a first embodiment of the present invention with reference to figures. FIG. 1 is a partly-enlarged plan view of a substantial part of the magnetic sensor device of the first embodiment of the present invention, viewed from the surface opposing a magnetic recording medium. The X-Y cross section of the substantial part of the magnetic sensor device of the first embodiment of the present invention is illustrated in the plan view in FIG. 1.

As illustrated in FIG. 1, the magnetic sensor device 1 includes: a magnetic layer 2; a buffer layer 3 deposited on the magnetic layer 2; and a magnetic sensing section 7 constituted by a magneto-resistive device in which a fixed magnetization layer 4, a non-magnetic layer 5, and a magnetization-free layer 6 are deposited on the buffer layer 3 in this order. The magnetic sensor device 1 further includes: a buffer layer 8 which is deposited so that the buffer layers 3 and 8 sandwich the magnetic sensing section 7; and a biasing layer 10 which covers the right and left sides of the part constituted by the buffer layer 3, the magnetic sensing section 7, and the buffer layer 8 and which is deposited on the magnetic layer 2 with a nonconductor layer 9 being interposed therebetween. The magnetic sensor device 1 further includes: a magnetic layer 11 which is deposited to cover the surfaces of the buffer layer 8, the nonconductor layer 9, and the biasing layer 10; a dielectric layer 12 which is formed so as to have a concave whose shape corresponds to the shape of a protruding section of a later-detailed metal layer 13, after being deposited on the magnetic layer 11; and the metal layer 13 deposited on the dielectric layer 12. The magnetic layer 11, the dielectric layer 12, and the metal layer 13 constitute a near field light generation section 14.

The magnetic layer 2 and the magnetic layer 11 are made of a soft magnetic material such as NiFe and NiFeTa, and function, when the magnetic sensor device 1 is used in a reproducing head of a magnetic reproducer, as a magnetic shield which cancels out a leakage magnetic field generated from a bit neighboring a target bit of information reproduction from the magnetic recording medium and a stray magnetic field inside the magnetic reproducer, which fields generate noises, so as to improve the magnetic field detection resolution in the film thickness direction of the magnetic sensing section 7 (i.e. Y direction in FIG. 1 and the direction along the tracks of the magnetic recording medium). The magnetic layer 2 and the magnetic layer 11 also function as electrodes for supplying a current to the magnetic sensing section 7. The film thickness of each of the magnetic layer 2 and the magnetic layer 11 may be arbitrarily determined on condition that a magnetic field which generates noise is cancelled out. The magnetic layer 11 is preferably about 50 nm to 500 nm thick and the magnetic layer 2 is preferably about 500 nm to 3 μm thick, in consideration of achieving effective photo-assisted reproduction by arranging the near field light 16 and the magnetic sensing section 7 to be close to one another. The magnetic layer 11 is arranged to be in contact with the dielectric layer 12 so that the magnetic layer 11 mutually interacts with the tip of the protruding section of the metal layer 13 (i.e. multiple interference occurs therebetween) and hence the intensity of the near field light 16 is enhanced.

The buffer layer 3 and the buffer layer 8 are provided for the purpose of (i) reducing the coarseness of the film surface of the magnetic sensing section 7, (ii) improving the adhesion properties between the layers constituting the magnetic sensing section 7 and the magnetic layers 2 and 11, and (iii) preventing the magnetic sensing section 7 from being damaged during processing such as etching. The buffer layer 3 is made of a material such as Ta, Ti, Pt, and Ru or constructed by laminating layers made of these materials.

The fixed magnetization layer 4 in the magnetic sensing section 7 has a laminated structure (not illustrated) in which a ferromagnetic body and an antiferromagnetic body are laminated. In this layer the antiferromagnetic body fixes the magnetization direction of the ferromagnetic body to one direction. The ferromagnetic layer is made of a material such as Fe, CoFe, and CoFeB for example, whereas the antiferromagnetic layer is made of a material such as MnPt, MnIr, and MnFe for example. As an alternative to the above, the fixed magnetization layer 4 may be arranged so that a non-magnetic layer which is about 1 nm thick or less is provided in the ferromagnetic layer, for the purpose of restraining a magnetic field generated from the fixed magnetization layer 4 itself. The non-magnetic layer is made of a material such as Ru and Pt, for example.

The non-magnetic layer 5 in the magnetic sensing section 7 functions to cancel the magnetic coupling of the fixed magnetization layer 4 and the magnetization-free layer 6. When the non-magnetic layer 5 is made of a conductor represented by Cu, the magnetic sensor device 1 is a CPP-GMR (Current Perpendicular to Plane-Giant Magneto-Resistive) device. If the non-magnetic layer 12 is made of an insulator represented by $Al_2O_3$ and MgO, the magnetic sensor device 1 is a TMR (Tunneling Magneto-Resistive) device.

The magnetization-free layer 6 in the magnetic sensing section 7 is provided for detecting an external magnetic field. This layer is therefore preferably made of a material with high magnetic permeability. The magnetization-free layer 6 is for example made of one of Fe, NiFe, NiFeTa, CoFe, CoFeB, GdCo, GdFeCo, HoFeCo, FeRh, and FeRhIr, made of a material including at least one of these materials, or constructed by laminating plural layers made of these materials, respectively.

The magnetic sensing section 7 of the present embodiment is a magneto-resistive device. Alternatively, the section 7 may be a member which detects magnetism, such as a Hall-effect device.

The nonconductor layer 9 is provided for preventing the magnetic layer 2 and the magnetic layer 11 which also function as upper and lower electrodes from short-circuiting one another. The layer 9 is made of a material such as $Al_2O_3$ and $SiO_2$, which has high electric resistance.

The biasing layer 10 is provided for applying a biasing magnetic field which makes the magnetization direction of the magnetization-free layer 6 uniform. The biasing layer 10 is constituted by a ferromagnetic body such as CoPt, CoFePt, CoPtB, CoCrPt, and CoCrPtB.

The dielectric layer 12 is provided for generating near field light 16 on the medium-facing surface (which is opposite to the surface to which the light beam 15 is applied) of the magnetic sensor device 1 by diffusing, as surface plasmons, an electric field of the light beam 15 irradiating the magnetic sensor device 1 at the interface between the metal layer 13 and the magnetic layer 11. For the purpose of efficiently diffusing surface plasmons, the dielectric layer 12 is made of a dielectric material with a low refractive index. Specific examples of the material of the dielectric layer 12 include $SiO_2$, SiN, $Al_2O_3$, AlN, $MgF_2$, and MgO.

The metal layer 13 diffuses surface plasmons at the interface with the dielectric layer 12 so as to generate near field light 16 on the medium-facing surface (which is opposite to the surface to which the light beam 15 is applied) of the magnetic sensor device 1. The metal layer 13 is made of a material which allows light beam 15 having wavelengths of around visible light and emitted from a semiconductor laser to efficiently diffuse as plasmons. For example, when the wavelength of light beam is around the wavelengths (around 400 to 1300 nm) producible by the semiconductor laser, the metal layer 13 is made of a material with high plasmon generation efficiency such as Au, Ag, and Al or an alloy material (non-magnetic material) mainly made of these materials. It is noted that the metal layer 13 is not necessarily made of the aforesaid material. For example the layer may be made of a magnetic material. As illustrated in FIG. 1, the metal layer 13 has at a part of the same a protruding section protruding toward the magnetic layer 11. The distance between the magnetic layer 11 and the tip of the protruding section of the metal layer 13 is not shorter than 5 nm and not longer than 100 nm, or not shorter than 15 nm and not longer than 50 nm.

FIG. 1 schematically illustrates that the light beam 15 whose optical axis locates around the dielectric layer 12 formed between the magnetic layer 11 and the protruding section of the metal layer 13 is applied in the direction perpendicular to the figure toward the viewer, so that near field light 16 occurs on the surface (closer to the viewer of the figure of the magnetic sensor device 1 opposite to the surface (further from the viewer of the figure to which surface the light beam 15 is applied. The near field light 16 illustrated in FIG. 1 is enhanced by the mutual interaction (multiple interference) between the protruding section of the metal layer 13 and the magnetic layer 11.

Now how the magnetic sensor device 1 is manufactured is discussed. FIG. 2 illustrates the manufacturing steps of the magnetic sensor device shown in FIG. 1 in order. It is noted that the magnetic sensor device 1 is formed by sputtering.

First of all, a insulating layer 18 made of $SiO_2$ and 50 nm thick is formed on a substrate 17 made of n-type GaAs, and then a magnetic layer 2 made of NiFe and 1 μm thick is formed thereon (see FIG. 3(a)). This electrically insulates the magnetic layer 2 from the substrate 17.

Then a buffer layer 3 made of Ta and 50 nm thick is formed. Subsequently a magnetic sensing section 7 is formed by depositing: a fixed magnetization layer 4 made of MnPt (15 nm thick), CoFeB (3 nm thick), Ru (0.8 nm thick), and CoFeB (2.5 nm thick); a non-magnetic layer 5 made of MgO (1 nm thick); and a magnetization-free layer 6 made of CoFeB (3 nm thick) and NiFe (5 nm thick). Then a buffer layer 8 made of Ta and 50 nm thick is formed (see FIG. 3(b)).

Thereafter a photoresist (not illustrated) is formed on a predetermined part of the surface of the buffer layer 8, and a part in which the buffer layer 8, the magnetic sensing section 7, and the buffer layer 3 are laminated is processed by photolithography so that the width of the magnetization-free layer 6 (i.e. the length in the crosswise direction in FIG. 2) becomes 100 nm. Then a nonconductor layer 9 made of $SiO_2$ and 5 nm thick is formed that part thus processed, and a biasing layer 10 made of CoPtB and 100 nm thick is formed.

Thereafter the photoresist on the buffer layer 8 is removed. In so doing, parts of the nonconductor layer 9 and the biasing layer 10 on the photoresist are removed at the same time (see FIG. 3(c)).

Thereafter, on the buffer layer 8, the nonconductor layer 9, and the biasing layer 10, a magnetic layer 11 made of NiFe and 150 nm thick is formed (see FIG. 3(d)).

After forming a dielectric layer 12 made of $SiO_2$ and 3 μm thick (see FIG. 3(e)), the dielectric layer 12 is processed by photolithography and reactive ion etching so that a concave having a substantially V shape is formed in the dielectric layer 12. This substantially V-shaped concave is filled by the formation of a metal layer 13 made of An and 3 μm thick (see FIG. 3(f)). As a result a near field light generation section 14 is formed by the magnetic layer 11, the dielectric layer 12, and the metal layer 13.

Lastly, although not illustrated in the figure, the laminated part from the insulating layer 18 to the metal layer 13 is processed so that the length in the Z direction (i.e. in the direction away from the viewer of FIG. 1) becomes 100 nm. The manufacture of the magnetic sensor device 1 is completed after this step. In the step above, the length of the magnetic sensor device 1 in the Z direction is set at 50 nm or longer, for the purpose of preventing the light beam 15 from passing through the magnetic sensor device 1. The manufacture of the magnetic sensor device 1 is completed after performing the aforesaid steps.

The layers of the magnetic sensor device 1 are formed by sputtering in the case above. Alternatively, the magnetic layer 11 may be formed by electroforming.

The magnetic sensor device 1 structured as above has properties such that the magnetization direction of the magnetization-free layer 6 changes in accordance with the direction of an external magnetic field, and an amount of a current flowing into the magnetic sensing section 7 is changed in accordance with whether or not the magnetization direction of the magnetization-free layer 6 is in parallel to the magnetization direction of the fixed magnetization layer 4. Utilizing these properties, for example magnetically-recorded information can be read out from a magnetic recording medium.

In the magnetic sensor device 1 of the present embodiment, the magnetic layer 2 and the magnetic layer 11 can function as both a magnetic shield of the magnetic sensing section 7 and a member which generates and enhances near field light 16 in response to the application of laser light from a laser light source. This makes it possible to achieve both of the following effects: a part where near field light 16 is generated is provided to be very close to the magnetic sensing section 7 (more specifically, the magnetization-free layer 6); and amplified near field light 16 with high intensity is applied to a magnetic recording medium. Since the near field light generation section 14 is provided to be very close to the magnetic sensing section 7, it is possible to very efficiently restrain the natural cooling of the heated area of the magnetic recording medium, which area is heated by the near field light 16. This makes it possible to achieve efficient photo-assisted reproduction.

Furthermore, the magnetic sensor device 1 of the present embodiment is arranged such that the tip of the protruding section of the metal layer 13 from which near field light 16 is generated and the magnetic sensing section 7 are successively formed by a thin film formation method. It is therefore unnecessary to separately form a device for generating near field light 16 and a magnetic sensor device 1 and combine these members, and it is unnecessary to align the near field light 16 generation source with the magnetic sensing section 7. For these reasons the manufacturing process is simplified and a magnetic sensor device 1 which can perform near-field photo-assisted reproduction with high precision is realized.

In addition to the above, the power consumption of the laser light source is restrained because it is unnecessary to heat the magnetic recording medium to a very high temperature. In addition to the above, photo-assisted reproduction with high resolution is realized because the heated area of the magnetic recording medium is small. In addition to the above, greater design freedom is attained because it is no longer the case that information in a magnetic recording medium is mistakenly erased at the time of photo-assisted reproduction. This permits the hybridization with a recording device. In addition to the above, near field light 16 with high intensity is obtained even when the light from the laser light source has low power, because as described above enhanced near field light 16 with high intensity is applied to a magnetic recording medium. The decrease in the power consumption of the laser light source is further ensured for this reason. In addition to the above, a magnetic sensor device 1 with high magnetic field detection capability is realized because as described above the intensity of irradiating laser light is reducible and hence the magnetic sensing section 7 is not excessively heated.

Furthermore, since the magnetic layer 11 is a part of the near field light generation section 14 and at the same time functions as a magnetic shield, the number of components is small as compared to a case where a member functioning as a magnetic shield and a member for generating and enhancing near field light are separately formed. In addition to the above, since the magnetic sensing section 7 and the near field light generation section 14 are successively formed on the same substrate 17 by the thin film formation method, it is possible to realize a magnetic sensor device 1 which is manufactured at low cost, is small in size, is light in weight, and can be easily hybridized with a recording device.

In addition to the above, the metal layer 13 has a protruding section protruding toward the magnetic layer 11. Therefore near field light 16 is locally generated at around the tip of the protruding section of the metal layer 13 in response to the application of the light beam 15, and the near field light 16 is enhanced by the resonance (multiple interference) between surface plasmons generated at the interface between the dielectric layer 12 and the metal layer 13 and surface plasmons generated at the interface between the magnetic layer 11 and the dielectric layer 12. For this reason a magnetic recording medium is efficiently heated. This realizes a magnetic sensor device 1 which can perform photo-assisted reproduction with high reproduction resolution.

Second Embodiment

Figure 3:
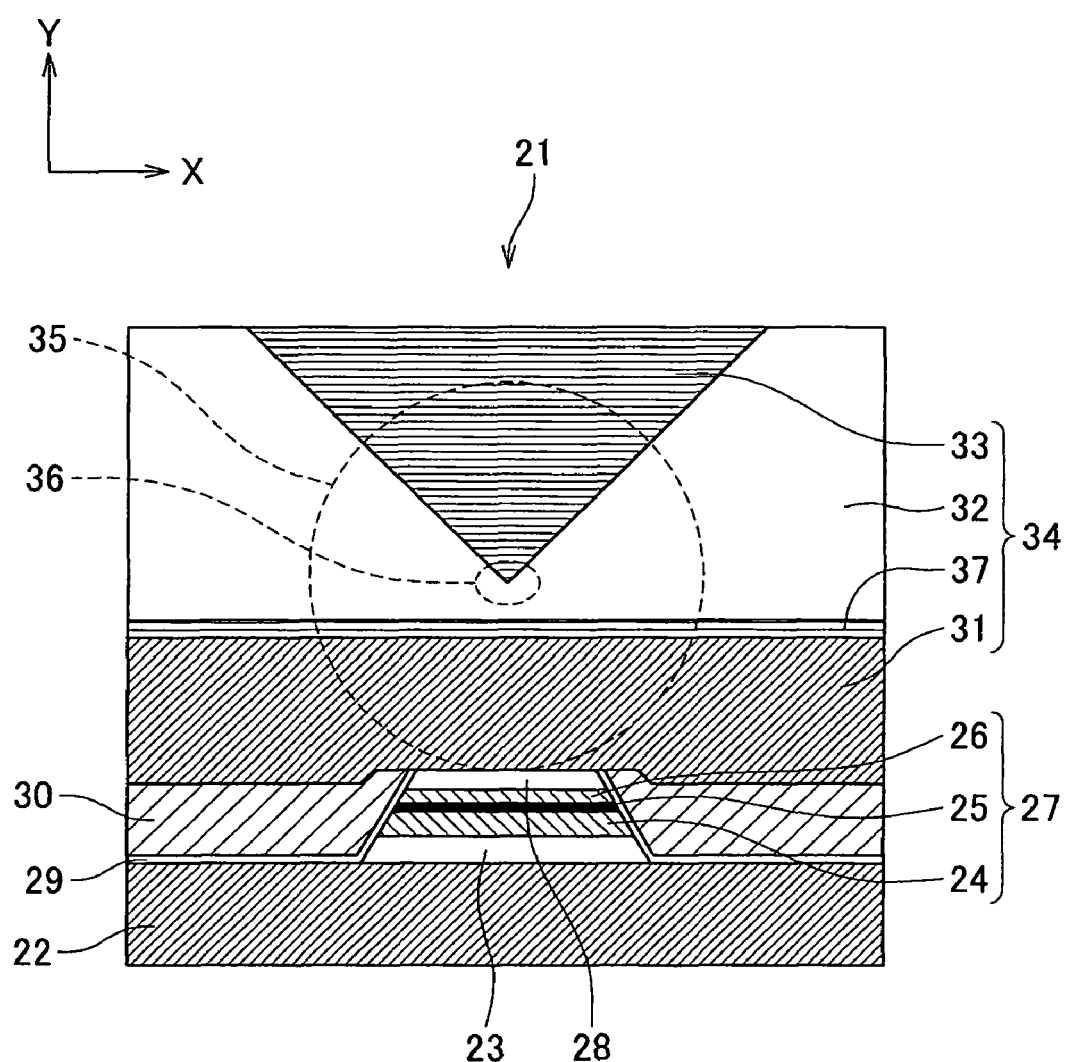
FIG. 3 is a partly-enlarged plan view of a substantial part of the magnetic sensor device of the second embodiment of the present invention, viewed from the surface opposing a magnetic recording medium.

Now the following describes a magnetic sensor device of a second embodiment of the present invention. FIG. 3 is a partly-enlarged plan view of a substantial part of the magnetic sensor device of the second embodiment of the present invention, viewed from the surface opposing a magnetic recording medium. It is noted that members identical with the members 1 to 16 in the first embodiment are numbered as 21 to 36 and the descriptions thereof may be omitted. The substantial part of the magnetic sensor device of the second embodiment of the present invention is illustrated in the plan view in FIG. 3 in X-Y cross section.

The magnetic sensor device 21 of FIG. 3 is different from the magnetic sensor device 1 of the first embodiment in that a metal layer 37 is formed between a dielectric layer 32 and a magnetic layer 31, and a laminated part constituted by the magnetic layer 31, the metal layer 37 (second metal layer), the dielectric layer 32, and a metal layer 33 (first metal layer) functions as a near field light generation section 34.

The metal layer 37 is made of Au, Ag, Al, or an alloy thereof, as in the case of the metal layer 33.

The manufacturing method in the present embodiment is substantially identical with that of the first embodiment, except the inclusion of a step in which a metal layer 37 is formed after the formation of a magnetic layer 31, and then a dielectric layer 32 is formed.

The magnetic sensor device 21 of the present embodiment exerts effects similar to those of the first embodiment, and the metal layer 37 allows surface plasmons generated by light beam 35 emitted from a semiconductor laser to efficiently diffuse at the interface with the dielectric layer 32, as in the case of the metal layer 33. That is to say, since the effect of multiple interference of electric fields between the metal layer 37 formed in contact with the magnetic layer 31 and the protruding section of the metal layer 33 is stronger than the effect of the magnetic sensor device 1 of the first embodiment, highly-intense near field light 36 is obtained and a magnetic sensor device 21 which can heat a magnetic recording medium further efficiently is realized.

Furthermore, because of the effects above, highly-intense near field light 36 is obtained even if the irradiated light beam 35 has low intensity. This makes it possible to further reduce the power consumption of the laser light source. As the intensity of the applied light beam 35 is reduced, the heating temperature of the magnetic sensing section 27 is reduced and hence a magnetic sensor device 21 with high magnetic field detection capability is realized.

Third Embodiment

Figure 4:
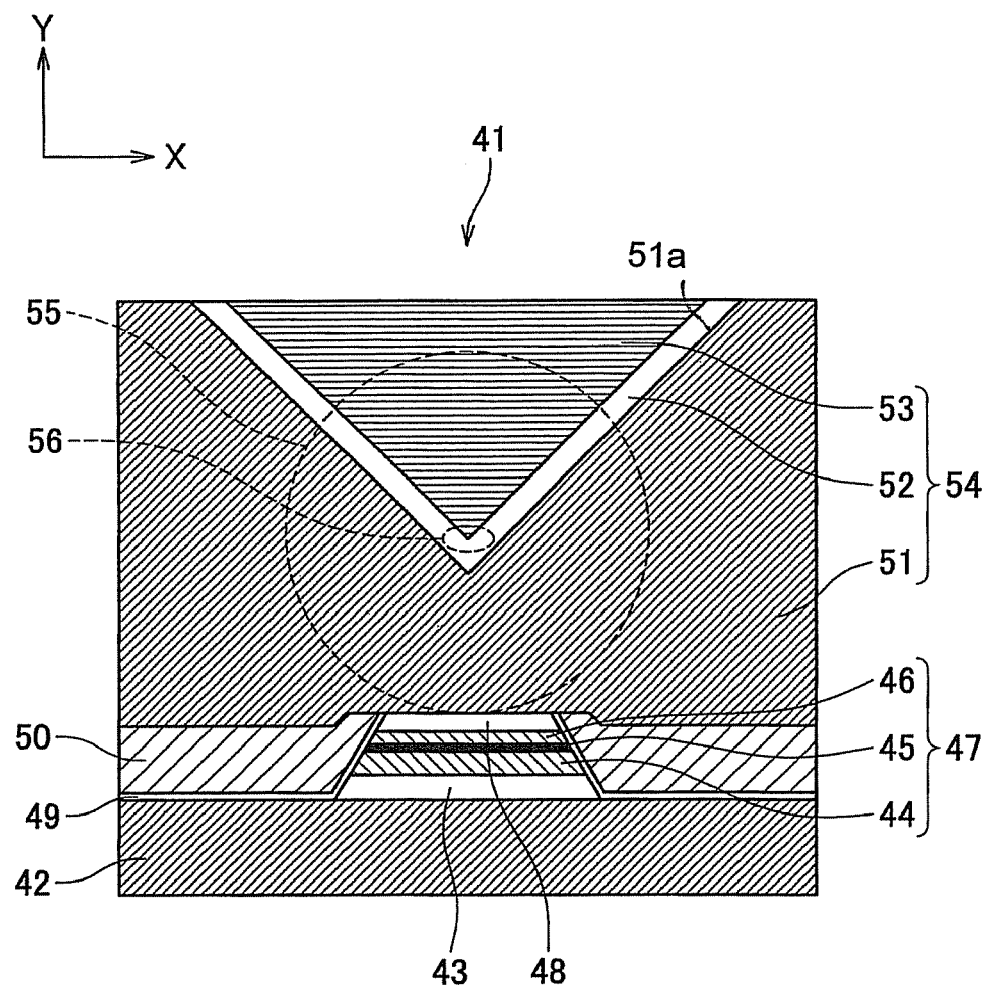
FIG. 4 is a partly-enlarged plan view of a substantial part of the magnetic sensor device of the third embodiment of the present invention, viewed from the surface opposing a magnetic recording medium.

Now, the following describes a magnetic sensor device of a third embodiment of the present invention. FIG. 4 is a partly-enlarged plan view of a substantial part of the magnetic sensor device of the third embodiment of the present invention, viewed from the surface opposing a magnetic recording medium. It is noted that members identical with the members 1 to 16 in the first embodiment are numbered as 41 to 56 and the descriptions thereof may be omitted. The substantial part of the magnetic sensor device of the third embodiment of the present invention is illustrated in the plan view in FIG. 4 in X-Y cross section.

The magnetic sensor device 41 of FIG. 4 is different from the magnetic sensor device 1 of the first embodiment in that a dielectric layer 52 is in contact with a substantially V-shaped cross section fit to the shape of the protruding section, and a magnetic layer 51 has a substantially V-shape concave portion 51a corresponding to the substantially V-shape of the dielectric layer 52.

The manufacturing method in the present embodiment is substantially identical with that of the first embodiment, except the inclusion of the following steps in place of the steps of the formation of the magnetic layer 11 to the formation of the metal layer 13 in the first embodiment: forming a magnetic layer 51 which is 3 μm thick and forming a substantially V-shaped concave in the magnetic layer 51 by photolithography and reactive ion etching; forming a SiO$_2$ film of 25 nm thick in the concave and forming in the SiO$_2$ layer a dielectric layer 52 having a substantially V-shaped concave by photolithography and reactive etching; and forming an Au film 3 μm thick as a metal layer 53 so as to fill the substantially V-shaped concave of the dielectric layer 52.

The magnetic sensor device 41 of the present embodiment exerts effects similar to those of the first embodiment. In addition, near field light 56 which is smaller in size is obtained because an electric field is contained between the magnetic layer 51 and the metal layer 53. Therefore the size of a heated area on the magnetic recording medium is further reduced and hence photo-assisted reproduction with higher resolution is realized.

Furthermore, since the magnetic layer 51 is shaped as shown in FIG. 4, a part of the magnetic layer 51 around the near field light 56 is arranged to be thicker than the layer in the magnetic layer 11 of the first embodiment. For this reason it is possible to enhance the effect of canceling out a leakage magnetic field generated from a neighboring bit and a stray magnetic field outside the magnetic sensor device 41, which are sources of noise in the magnetic sensor device 41.

In addition to the above, since the overall cross sectional area of the dielectric layer 52 is downsized, it is possible to enhance the effect of preventing a transmissive light component (far field component) of the light beam 55 from passing through the surface of the magnetic sensor device 41 on which the near field light 56 is generated (i.e. the surface facing the magnetic recording medium).

Fourth Embodiment

Figure 5:
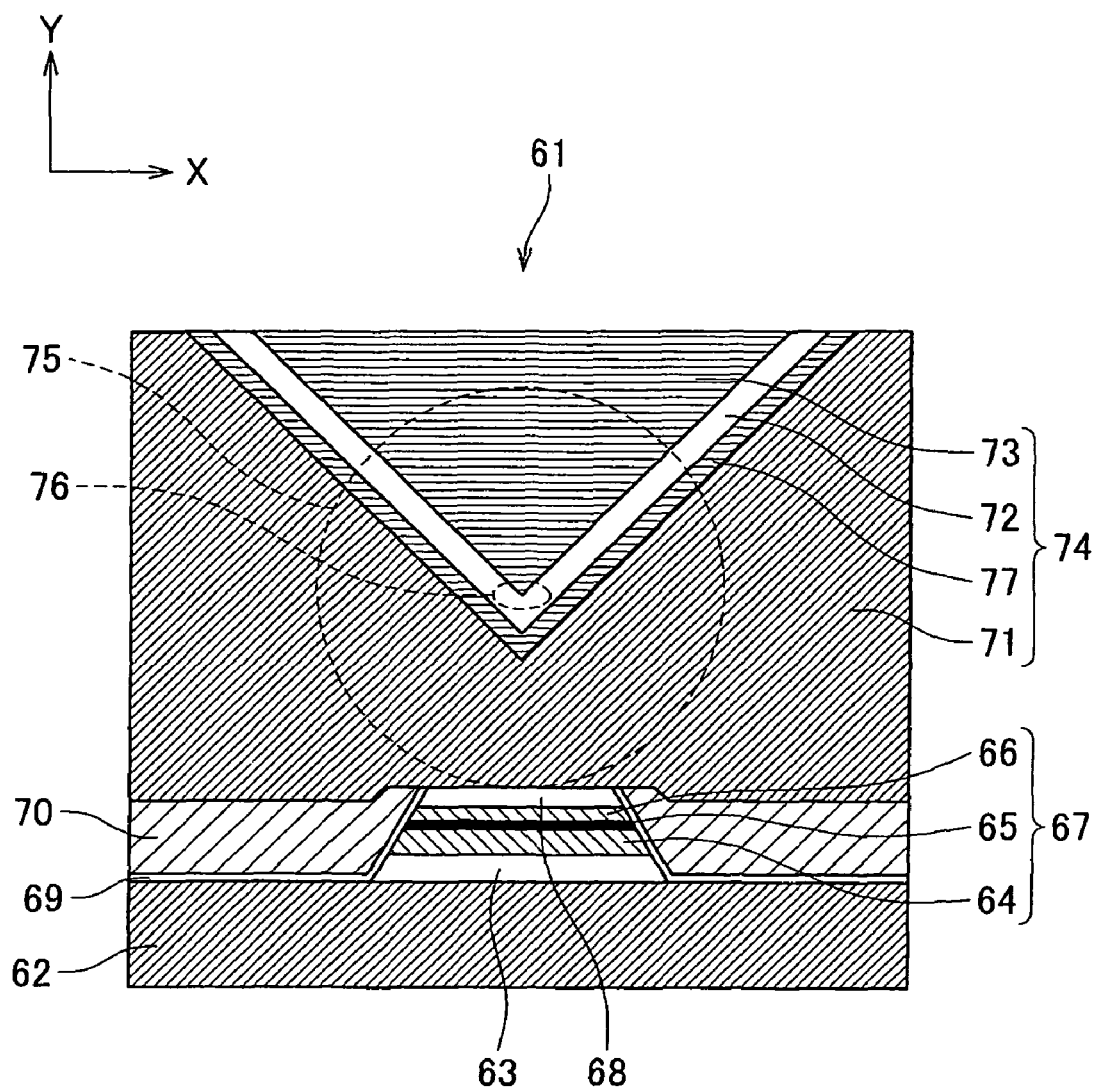
FIG. 5 is a partly-enlarged plan view of a substantial part of the magnetic sensor device of the fourth embodiment of the present invention, viewed from the surface opposing a magnetic recording medium.

Now, the following describes a magnetic sensor device of a fourth embodiment of the present invention. FIG. 5 is a partly-enlarged plan view of a substantial part of the magnetic sensor device of the fourth embodiment of the present invention, viewed from the surface opposing a magnetic recording medium. It is noted that members identical with the members 1 to 16 in the first embodiment are numbered as 61 to 76 and the descriptions thereof may be omitted. The substantial part of the magnetic sensor device of the fourth embodiment of the present invention is illustrated in the plan view in FIG. 5 in X-Y cross section.

The magnetic sensor device 61 of FIG. 5 is different from the magnetic sensor device 1 of the first embodiment in that a dielectric layer 72 is in contact with a substantially V-shaped protruding section of a metal layer 73 (first metal layer) and has a substantially V-shaped cross section fit to the shape of the protruding section, a metal layer 77 (second metal layer) is formed to have a substantially V-shaped cross section corresponding to the substantially V-shape of the dielectric layer 72, and a magnetic layer 71 is concaved in a substantially V-shape corresponding to the substantially V-shape of the metal layer 77. In addition, the magnetic sensor device 61 is different from the magnetic sensor device 41 of the third embodiment in that the aforesaid metal layer 77 is formed so as to be sandwiched between the magnetic layer 71 and the dielectric layer 72.

Being similar to the metal layer 73, the metal layer 77 is made of Au, Ag, Al, or an alloy thereof.

The manufacturing method in the present embodiment is substantially identical with that of the first embodiment, except the inclusion of the following steps in place of the steps of forming the dielectric layer 52 and the metal layer 53 in the first embodiment: (1) forming a magnetic layer 71 having a substantially V-shaped concave; (2) then forming a metal layer 77 which has a substantially V-shaped cross section and 2 nm to 100 nm thick, along the concave of the magnetic layer 71; (3) then forming a dielectric layer 32 which has a substantially V-shaped cross section and 25 nm thick, along the metal layer 77; and (4) lastly forming a metal layer 73 (made of Au and 3 μm thick) so as to fill the aforesaid substantially V-shaped concave at the upper part of the dielectric layer 32.

The effects of the magnetic sensor device 61 of the present embodiment are identical with those of the third embodiment, even if there is a difference in the containment of an electric field between the magnetic layer 71 and the metal layer 73.

Fifth Embodiment

Figure 6:
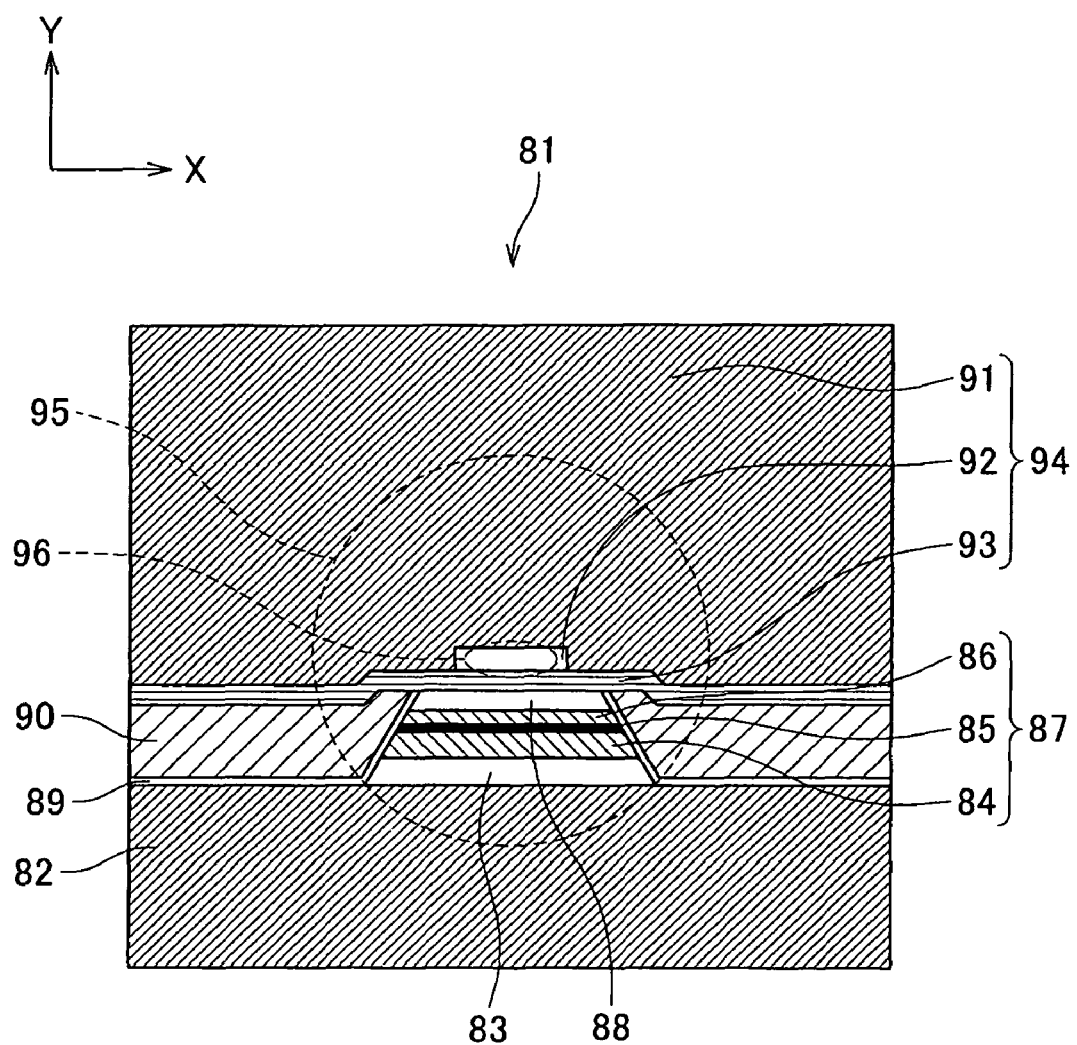
FIG. 6 is a partly-enlarged plan view of a substantial part of the magnetic sensor device of the fifth embodiment of the present invention, viewed from the surface opposing a magnetic recording medium.

Now, the following discusses a magnetic sensor device of a fifth embodiment of the present invention. FIG. 6 is a partly-enlarged plan view of a substantial part of the magnetic sensor device of the fifth embodiment of the present invention, viewed from the surface opposing a magnetic recording medium. It is noted that members identical with the members 1 to 16 in the first embodiment are numbered as 81 to 96 and the descriptions thereof may be omitted. The substantial part of the magnetic sensor device of the fifth embodiment of the present invention is illustrated in the plan view in FIG. 6 in X-Y cross section.

The magnetic sensor device 81 of FIG. 6 is chiefly different from the magnetic sensor device 1 of the first embodiment in that a near field light generation section 94 is included in which a metal layer 93, a dielectric layer 92, and a magnetic layer 91 are formed in this order on a buffer layer 88, a nonconductor layer 89, and a biasing layer 90. In other words, the difference lies in that a dielectric layer 92 and a metal layer 93 are formed between a magnetic layer 91 and a magnetic sensing section 87.

Specifically, the near field light generation section 94 is arranged so that a concave is formed in a part of the surface of the magnetic layer 91, the surface being on the metal layer 93 side, the entirety of the dielectric layer 92 is formed in the concave, and the magnetic layer 91 and the metal layer 93 enclose the dielectric layer 92. The magnetic layer 91 may be 500 nm thick or more, because the source of near field light irradiating the dielectric layer 92 is not distanced from the magnetic sensing section 87 even if the magnetic layer 91 is relatively thick.

The metal layer 93 is in contact with the magnetic sensing section 87 with the buffer layer 88 being interposed therebetween. The metal layer 93 also functions as an electrode of the magnetic sensing section 87.

A manufacturing method of the magnetic sensor device 81 is discussed. FIG. 7 shows manufacturing steps of the magnetic sensor device of FIG. 6 in order.

First, as illustrated in the manufacturing steps (a) to (c) in FIG. 7 which are identical with the steps (a) to (c) in the first embodiment in FIG. 2, an insulating film 98 which is made of $SiO_2$ and 50 nm thick is formed on a substrate 97 made of n-type GaAs, then formed are a magnetic layer 82, a buffer layer 83, a magnetic sensing section 87 constituted by a magneto-resistive device in which a fixed magnetization layer 84, a non-magnetic layer 85, and a magnetization-free layer 86 are deposited in this order, a buffer layer 88, a nonconductor layer 89, and biasing layer 90 in order.

Subsequently, on the buffer layer 88, the nonconductor layer 89, and the biasing layer 90, a metal layer 93 and a dielectric layer 92 are deposited in this order (see FIG. 7(d)). After processing the dielectric layer 92 to have a substantially rectangular shape by photolithography (see FIG. 7(e)), a magnetic layer 91 is deposited so as to cover not only the dielectric layer 92 but also the metal layer 93 (see FIG. 7(f)). The formation of the magnetic sensor device 81 is completed after the steps above.

The magnetic sensor device 81 of the present embodiment exerts effects similar to those of the first embodiment (except the effect regarding the protruding section of the metal layer 13 in the first embodiment). Furthermore, the magnetic sensor device 81 of the present embodiment exerts an effect described below. In the magnetic sensor device 81, the dielectric layer 92 is formed on the magnetic sensing section 87 side of the magnetic layer 91, thereby allowing light beam 95 to have its optical axis around the dielectric layer 92. As a result the near field light 96 is generated on the magnetic sensing section 87 side of the magnetic layer 91. Therefore the generated near field light 96 is very close to the magnetic sensing section 87 when the metal layer 93 is thin. This makes it possible in photo-assisted reproduction to detect a leakage magnetic field by the magnetic sensing section 87 while the temperature of the magnetic recording medium heated by the near field light 96 has not been decreased very much. It is therefore possible to realize near field photo-assisted reproduction with extremely high efficiency.

Even when the magnetic layer 91 is thick, the source of near field light 96 is not distanced from the magnetic sensing section 87. It is therefore possible to provide a magnetic sensor device 81 which can highly effectively cancel out a leakage magnetic field generated from a neighboring bit and an external stray magnetic field, which are sources of noise at the time of reproduction of a magnetic signal.

Furthermore, since the dielectric layer 92 is contained in the magnetic layer 91 and the metal layer 93, it is possible to obtain a highly intense electric field in a microscopic area corresponding to the size of the dielectric layer 92. For the reason above the size of near field light 96 to be generated is controllable by changing the size of the dielectric layer 92.

In addition, it is possible to allow near field light 96 to be generated from an area very close to the magnetic sensing section 87, only by adding a near field light generation section 94 about 15 nm thick at the minimum to a known magneto-resistive device. This makes it possible to not only provide a low-cost and light magnetic sensor device 81 only with small increase in the number of components and manufacturing steps but also realize highly efficient photo-assisted reproduction. Furthermore, an increase in the film thickness is restrained as above. It is therefore possible to provide a magnetic sensor device 81 with high reproduction resolution, in which a noise magnetic field of the magnetic layer 91 is properly canceled out even if near field light 96 is generated from an area between the magnetic layer 91 and the magnetic sensing section 87.

Sixth Embodiment

Figure 8:
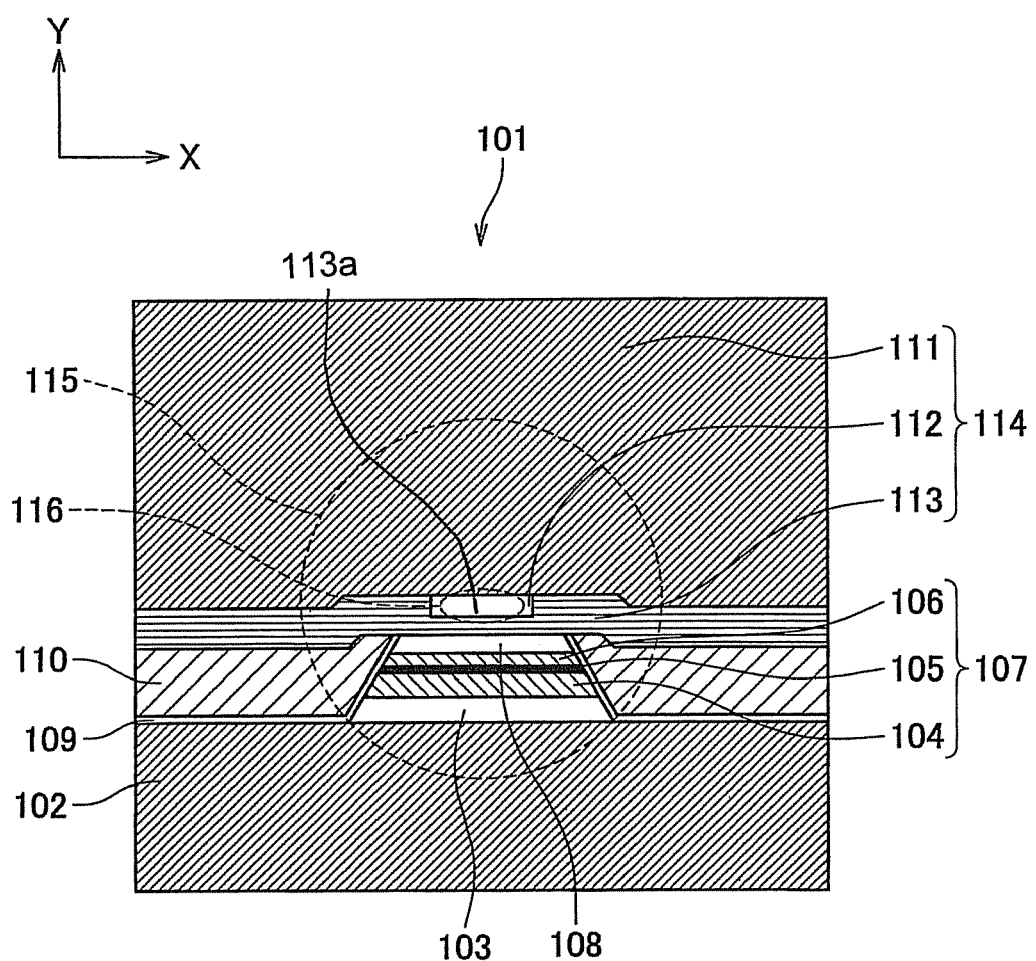
FIG. 8 is a partly-enlarged plan view of a substantial part of the magnetic sensor device of the sixth embodiment of the present invention, viewed from the surface opposing a magnetic recording medium.

Now a magnetic sensor device of a sixth embodiment of the present invention is described. FIG. 8 is a partly-enlarged plan view of a substantial part of the magnetic sensor device of the sixth embodiment of the present invention, viewed from the surface opposing a magnetic recording medium. It is noted that members identical with the members 1 to 16 in the first embodiment are numbered as 101 to 116 and the descriptions thereof may be omitted. The substantial part of the magnetic sensor device of the sixth embodiment of the present invention is illustrated in the plan view in FIG. 8 in X-Y cross section.

The magnetic sensor device 101 shown in FIG. 8 is different from the magnetic sensor device 1 of the first embodiment in that a near field light generation section 114 is included in which a metal layer 113, a dielectric layer 112, and a magnetic layer 111 are formed in order on a buffer layer 108, a nonconductor 109, and a biasing layer 110. That is to say, the difference lies in that the dielectric layer 112 and the metal layer 113 are formed between the magnetic layer 111 and the magnetic sensing section 107. Furthermore, the magnetic sensor device 101 is different from the magnetic sensor device 81 of the fifth embodiment in that a concave (groove 113a) is formed at a part of the surface of the metal layer 113 on the magnetic layer 111 side, the entirety of the dielectric layer 112 is formed in the concave, and the near field light generation section 114 in which a dielectric layer 112 is enclosed in a magnetic layer 111 and a metal layer 113 is provided.

The manufacturing method in the present embodiment is substantially identical with that of the fifth embodiment, except the inclusion of a step of forming at a part of a embedded metal layer 113 a concave in which a dielectric layer 112 is embedded and the exclusion of a step of forming a concave in the magnetic layer 111.

The magnetic sensor device 101 of the present embodiment exerts effects similar to those of the fifth embodiment.

Seventh Embodiment

Figure 9:
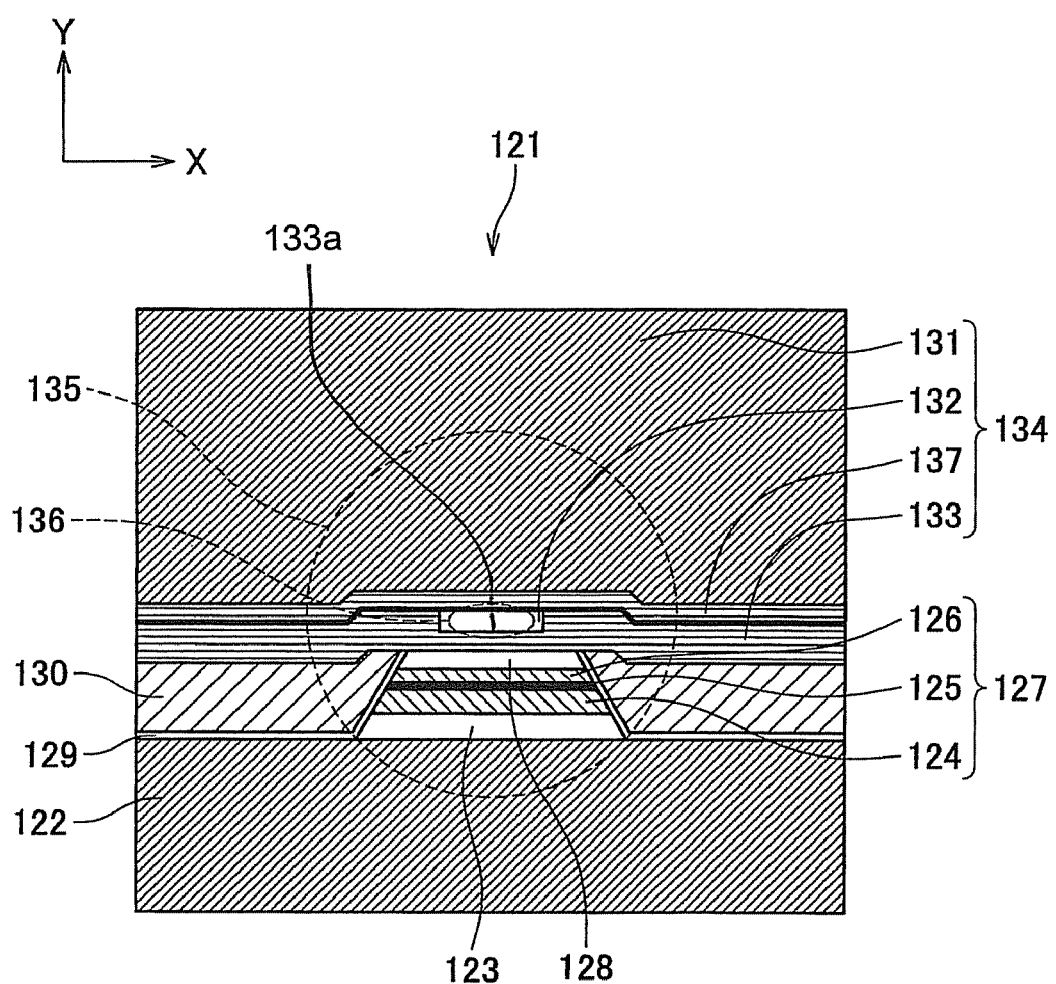
FIG. 9 is a partly-enlarged plan view of a substantial part of the magnetic sensor device of the seventh embodiment of the present invention, viewed from the surface opposing a magnetic recording medium.

Now the following describes a magnetic sensor device of a seventh embodiment of the present invention. FIG. 9 is a partly-enlarged plan view of a substantial part of the magnetic sensor device of the seventh embodiment of the present invention, viewed from the surface opposing a magnetic recording medium. It is noted that members identical with the members 1 to 16 in the first embodiment are numbered as 121 to 136 and the descriptions thereof may be omitted. The substantial part of the magnetic sensor device of the seventh embodiment of the present invention is illustrated in the plan view in FIG. 9 in X-Y cross section.

The magnetic sensor device 121 shown in FIG. 9 is different from the magnetic sensor device 1 of the first embodiment in that there is provided a near field light generation section 134 in which a metal layer 133 (first metal layer), a dielectric layer 132, a metal layer 137 (second metal layer), and a magnetic layer 131 are formed in order on a buffer layer 128, a nonconductor layer 129, and a biasing layer 130. That is to say, the difference lies in that the metal layer 137, the dielectric layer 132, and the metal layer 133 are formed between the magnetic layer 131 and the magnetic sensing section 127. Also, the magnetic sensor device 121 is different from the magnetic sensor device 101 of the sixth embodiment in that a concave (groove 133a) is formed at a part of the surface of the metal layer 133 on the magnetic layer 131 side, the entirety of the dielectric layer 132 is formed in the concave, and the near field light generation section 134 is provided so that a dielectric layer 112 is enclosed by a metal layer 133 and a metal layer 137 which are formed to be in contact with the magnetic layer 131.

Being similar to the metal layer 133, the metal layer 137 is made of Au, Ag, Al or an alloy thereof.

The manufacturing method in the present embodiment is substantially identical with that of the sixth embodiment, except the inclusion of a step of forming the metal layer 137 between (i) the metal layer 133 and (ii) the magnetic layer 131 and the dielectric layer 132.

The magnetic sensor device 121 of the present embodiment exerts effects similar to those of the fifth embodiment.

Eighth Embodiment

Figure 10:
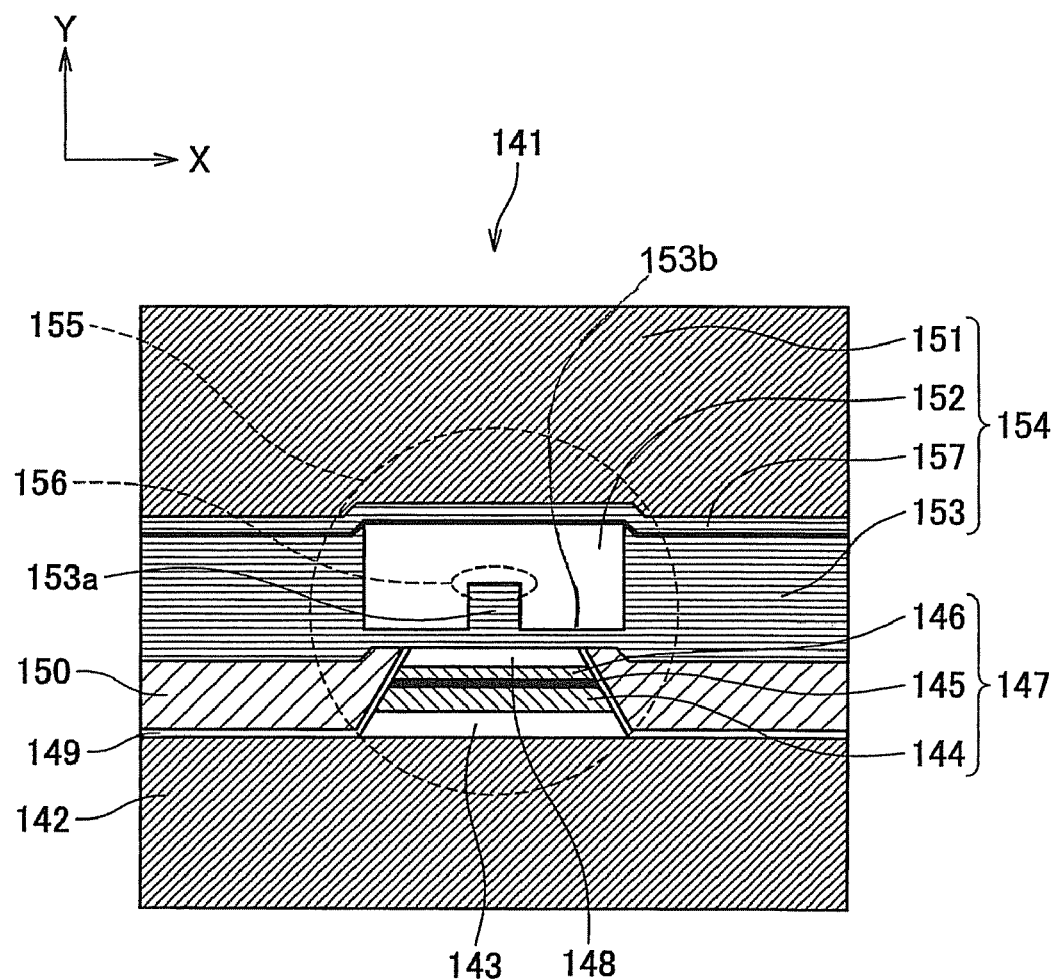
FIG. 10 is a partly-enlarged plan view of a substantial part of the magnetic sensor device of the eighth embodiment of the present invention, viewed from the surface opposing a magnetic recording medium.

Now the following describes a magnetic sensor device of an eighth embodiment of the present invention. FIG. 10 is a partly-enlarged plan view of a substantial part of the magnetic sensor device of the eighth embodiment of the present invention, viewed from the surface opposing a magnetic recording medium. It is noted that members identical with the members 1 to 16 in the first embodiment are numbered as 141 to 156 and the descriptions thereof may be omitted. The substantial part of the magnetic sensor device of the eighth embodiment of the present invention is illustrated in the plan view in FIG. 10 in X-Y cross section.

The magnetic sensor device 141 shown in FIG. 10 is different from the magnetic sensor device 1 of the first embodiment in that there is provided a near field light generation section 154 in which a metal layer 153 (first metal layer), a dielectric layer 152, a metal layer 157 (second metal layer), and a magnetic layer 151 are formed in order on a buffer layer 148, a nonconductor layer 149, and a biasing layer 150. That is to say, the difference lies in that the metal layer 157, the dielectric layer 152, and the metal layer 153 are formed between the magnetic layer 151 and the magnetic sensing section 147. Also, the magnetic sensor device 141 is different from the magnetic sensor device 121 of the seventh embodiment in that a protruding section 153a is formed substantially at the central part of the concave (groove 153b) of the metal layer 153.

Being similar to the metal layer 153, the metal layer 157 is made of Au, Ag, Al, or an alloy thereof.

The manufacturing method in the present embodiment is substantially identical with that of the sixth embodiment, except the inclusion of a step of not simply forming a concave but forming a concave in such a way that a protruding section 153a is formed substantially at the central part of the surface of the metal layer 153 on the magnetic layer 151 side.

The magnetic sensor device 141 of the present embodiment exerts effects similar to those of the first and fifth embodiments because light beam 155 is applied to the protruding section 153a.

Ninth Embodiment

Figure 11:
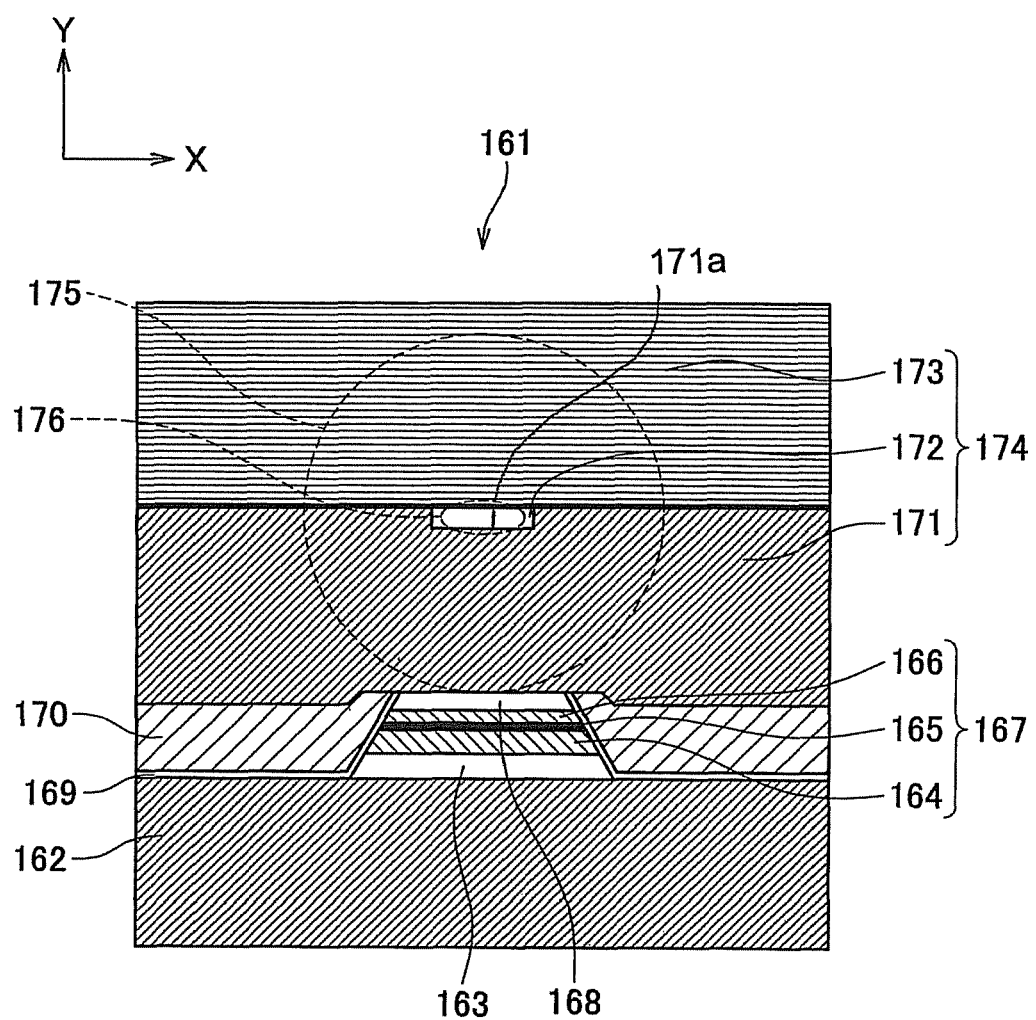
FIG. 11 is a partly-enlarged plan view of a substantial part of the magnetic sensor device of the ninth embodiment of the present invention, viewed from the surface opposing a magnetic recording medium.

Now the following describes a magnetic sensor device of a ninth embodiment of the present invention. FIG. 11 is a partly-enlarged plan view of a substantial part of the magnetic sensor device of the ninth embodiment of the present invention, viewed from the surface opposing a magnetic recording medium. It is noted that members identical with the members 1 to 16 in the first embodiment are numbered as 161 to 176 and the descriptions thereof may be omitted. The substantial part of the magnetic sensor device of the ninth embodiment of the present invention is illustrated in the plan view in FIG. 11 in X-Y cross section.

The magnetic sensor device 161 shown in FIG. 11 is different from the magnetic sensor device 1 of the first embodiment in that there is provided a near field light generation section 174 in which (i) a concave (groove 171a) is formed at a part of the surface of magnetic layer 171 on the metal layer 173 side, the magnetic layer 171 being formed on a buffer layer 168, a nonconductor layer 169, and a biasing layer 170, (ii) the entirety of a dielectric layer 172 is formed in the concave, and (iii) the dielectric layer 172 is enclosed by the magnetic layer 171 and the metal layer 173. Also, the magnetic sensor device 161 is different from the magnetic sensor device 81 of the fifth embodiment in that the magnetic sensor device 161 has a near field light generation section 174 in which a magnetic layer 171, a dielectric layer 172, and a metal layer 173 are deposited in this order from below to above, whereas the magnetic sensor 81 of the fifth embodiment has a near field light generation section 94 in which a metal layer 93, a dielectric layer 92, and a magnetic layer 91 are deposited in this order from below to above.

A manufacturing method of the present embodiment is identical with that of the fifth embodiment, except the steps carried out after the step of forming a buffer layer 168, a nonconductor layer 169, and a biasing layer 170. More specifically, the difference lies in that the manufacturing method of the present embodiment has a step of forming, before the formation of the metal layer 173, the magnetic layer 171 having the concave in which the dielectric layer 172 is embedded, on the buffer layer 168, the nonconductor layer 169, and the biasing layer 170.

The magnetic sensor device 161 of the present embodiment exerts effects similar to those of the fifth embodiment.

Tenth Embodiment

Figure 12:
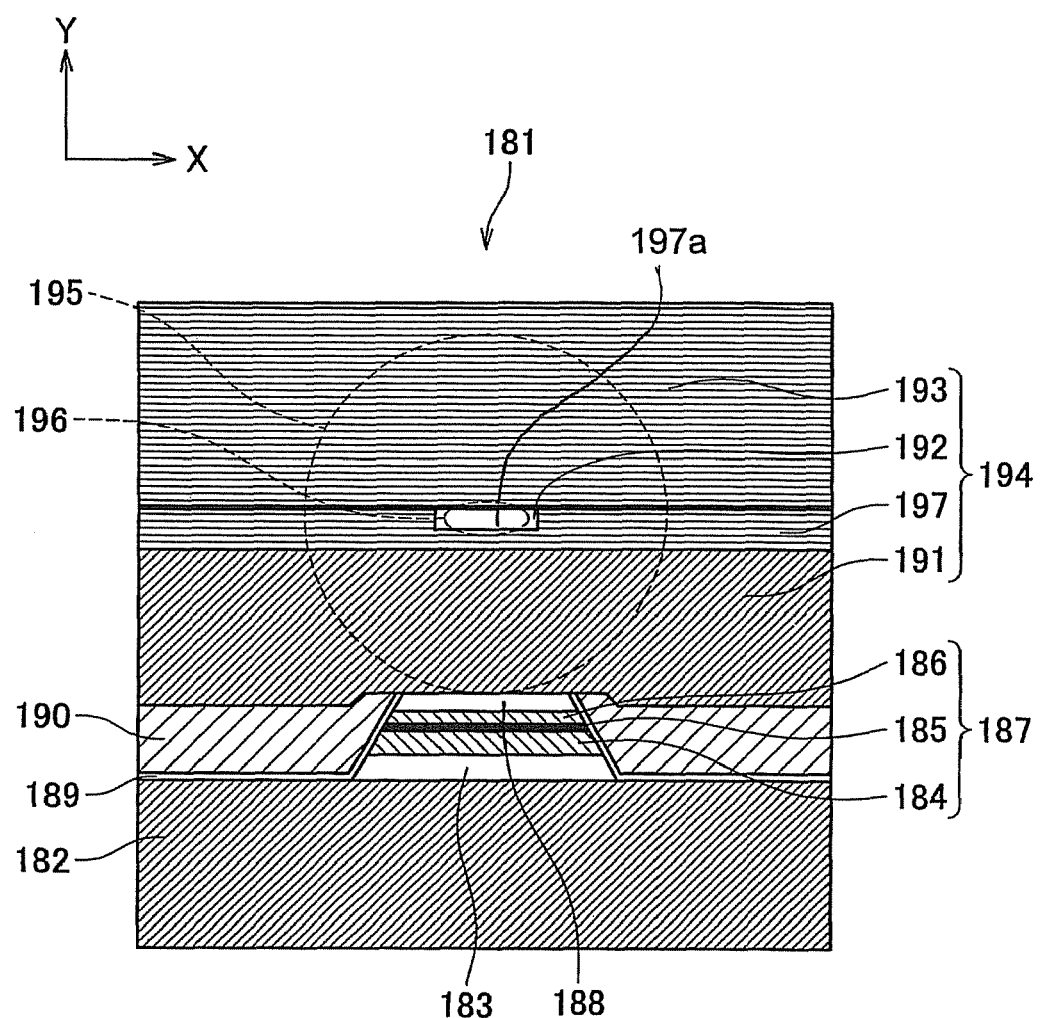
FIG. 12 is a partly-enlarged plan view of a substantial part of the magnetic sensor device of the tenth embodiment of the present invention, viewed from the surface opposing a magnetic recording medium.

Now the following describes a magnetic sensor device of a tenth embodiment of the present invention. FIG. 12 is a partly-enlarged plan view of a substantial part of the magnetic sensor device of the tenth embodiment of the present invention, viewed from the surface opposing a magnetic recording medium. It is noted that members identical with the members 1 to 16 in the first embodiment are numbered as 181 to 196 and the descriptions thereof may be omitted. The substantial part of the magnetic sensor device of the tenth embodiment of the present invention is illustrated in the plan view in FIG. 12 in X-Y cross section.

The magnetic sensor device 181 shown in FIG. 12 is different from the magnetic sensor device 1 of the first embodiment in that there is provided a near field light generation section 194 in which (i) a magnetic layer 191 and a metal layer 197 are formed in this order on a buffer layer 188, a nonconductive layer 189, and a biasing layer 190, (ii) a concave (groove 197a) is formed at a part of the surface of the metal layer 197 (second metal layer) on the metal layer 193 (first metal layer) side and the entirety of a dielectric layer 192 is formed in the concave, and (iii) the dielectric layer 192 is enclosed by the metal layer 193 and the metal layer 197. Also, the magnetic sensor device 181 is different from the magnetic sensor device 121 of the seventh embodiment in that the magnetic sensor device 181 has a near field light generation section 194 in which a magnetic layer 191, a metal layer 197, a dielectric layer 192, and a metal layer 193 are deposited in this order from below to above, whereas the magnetic sensor device 121 of the seventh embodiment has a near field light generation section 134 in which a metal layer 133, a dielectric layer 132, a metal layer 137, and a magnetic layer 131 are deposited in this order from below to above.

The manufacturing method in the present embodiment is substantially identical with that of the seventh embodiment, except that the order of deposition of layers in the near field light generation section 194 is, from below to above, the magnetic layer 191, the metal layer 197, the dielectric layer 192, and the metal layer 193.

The magnetic sensor device 161 of the present embodiment exerts effects similar to those of the seventh embodiment.

Eleventh Embodiment

Figure 13:
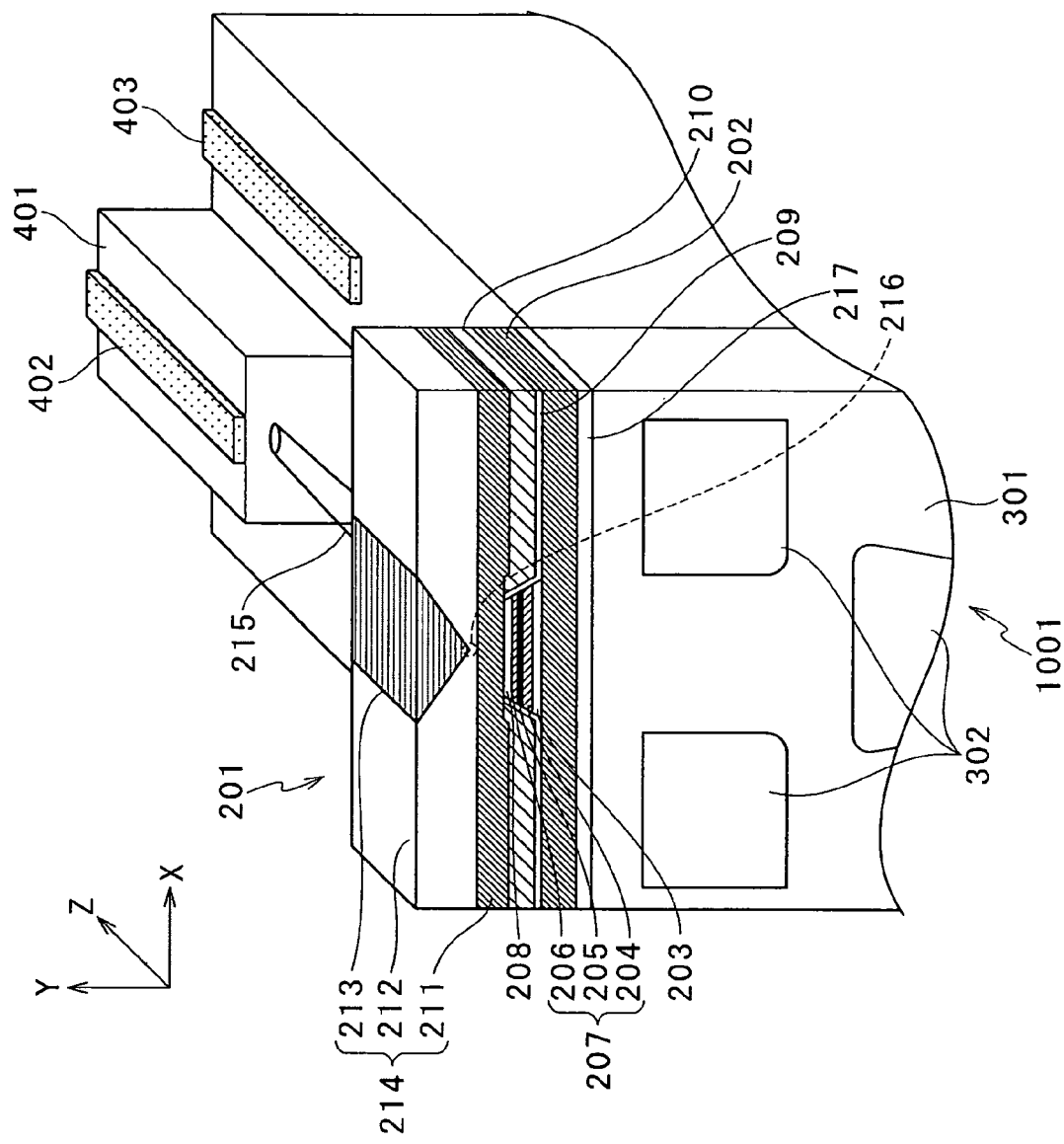
FIG. 13 is a perspective view of a substantial part of the magnetic reproduction head of the eleventh embodiment of the present invention.
Figure 14:
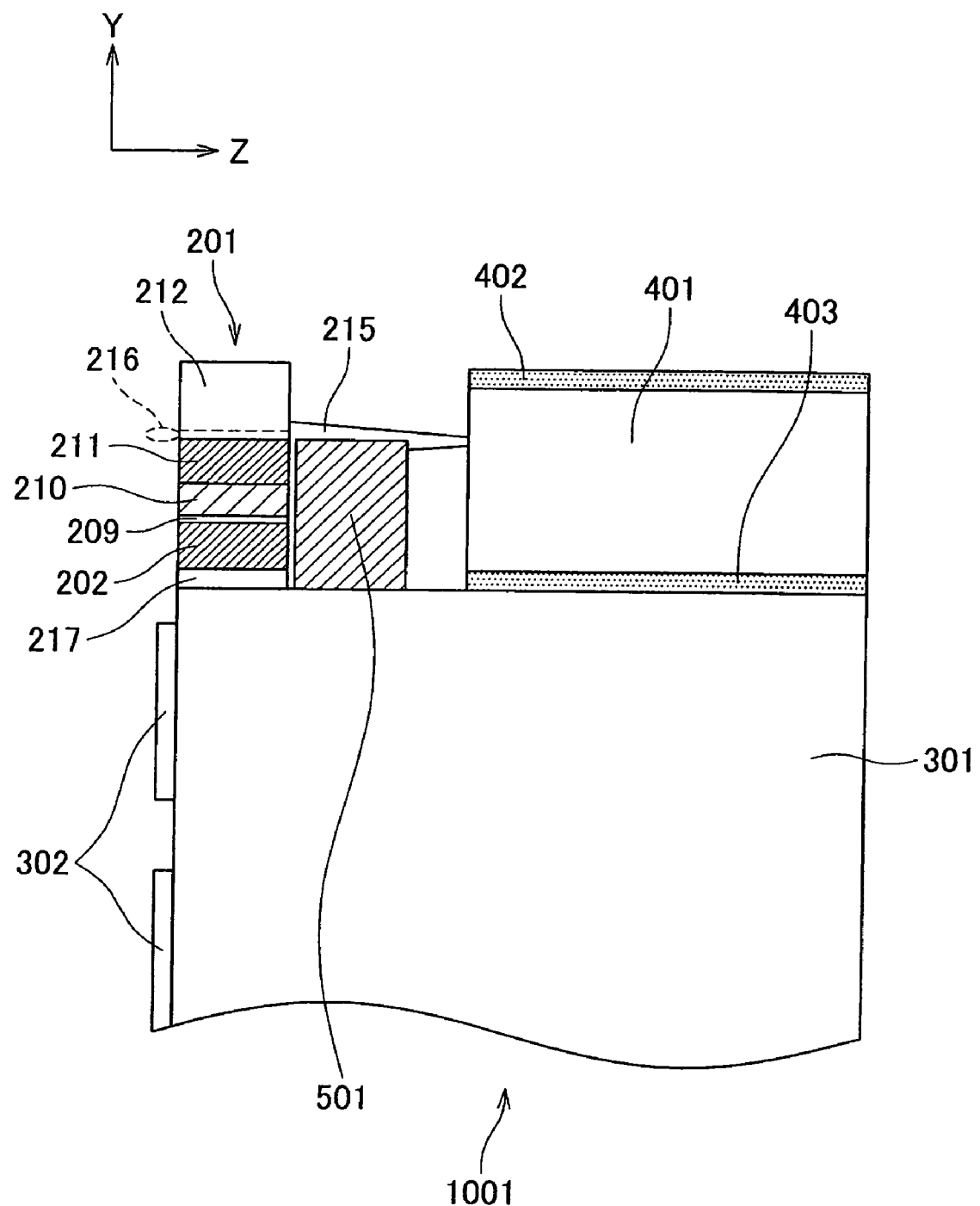
FIG. 14 is a profile (Y-Z plan view) of the magnetic reproduction head shown in FIG. 13.

Now the following describes a magnetic reproduction head of an eleventh embodiment of the present invention. FIG. 13 is a perspective view of a substantial part of the magnetic reproduction head of the eleventh embodiment of the present invention. FIG. 14 is a profile (Y-Z plan view) of the magnetic reproduction head shown in FIG. 13. It is noted that members identical with the members 1 to 16 in the first embodiment are numbered as 201 to 216 and the descriptions thereof may be omitted.

The magnetic reproduction head 1001 of the present embodiment includes: a magnetic sensor device 201 which is attached to a substrate 301 with an insulating layer 217 made of $SiO_2$ being interposed therebetween; a laser light source 401 which applies a light beam 215 onto a near field light generation section 214 of the magnetic sensor device 201; and a light-blocking member 501 which prevents a part of the light beam 215 from irradiating the magnetic sensing section 207.

The magnetic sensor device 201 is identical with the magnetic sensor device 1 of the first embodiment. However, the distance between the metal layer 13 and the magnetic layer 211 is arranged to be shorter than the wavelength of the light beam 215 in the area (beam spot) where the light beam 215 is applied. This prevents a transmissive light component (far field light) of the light beam 215 from reaching the surface, of the magnetic sensor device 201, which faces the magnetic recording medium. As a result only near field light 216 is separated.

The substrate 301 has ABS (Air Bearing Surface) sections 302, on its surface facing the magnetic recording medium. ABS sections 302 are arranged to protrude from the surface facing the magnetic recording medium, for the purpose of keeping the magnetic reproduction head 1001 to hover over the magnetic recording medium at the height of about 5 to 10 nm above the magnetic recording medium, by controlling the air flow between the magnetic reproduction head 1001 and the magnetic recording medium. Such ABS sections are typically used in a slider of a reproducing head of a known hard disc apparatus.

The laser light source 401 is formed on the same plane as the magnetic sensor device 201 of the substrate 301. When the metal layer 213 is mainly made of Au, the laser light source 401 is a semiconductor laser with the wavelength of about 600 nm to 1 μm. Examples of such a semiconductor laser include a GaAlAs semiconductor laser with the wavelength of about 750 to 850 nm, a GaAlInP semiconductor laser with the wavelength of about 620 to 680 nm, and a GaN semiconductor laser with the wavelength of about 405 nm. When the metal layer 213 is mainly made of Ag or Al, a short-wavelength semiconductor laser with the wavelength of 600 nm or shorter is adopted.

As electrodes of the laser light source 401, an electrode layer 402 and an electrode layer 403 are formed on the laser light source 401 and the substrate 301, respectively.

The light-blocking member 501 is formed on the substrate 301 and is close to the surface of the magnetic sensor device 201 to which surface the light beam 215 is applied. The light-blocking member 501 have height enough to block the light beam 215 applied to the magnetic sensing section 207. A material of the light-blocking member 501 is arbitrarily chosen as long as its transmittance is low. Non-limiting examples of the material include Au, Ag, Al, Cu, Pt, Ru, Ta, or an alloy thereof. Above all the light-blocking member 501 can also function as a radiator when it is made of a material with high thermal conductivity such as Au, Au, and Cu. The light-blocking member 501 is required to be thick enough in the Z direction to block the light beam 215. The light-blocking member 501 is for example 50 nm thick or more. In the X direction, the thickness of the light-blocking member 501 is longer than the diameter of the light spot of the light beam 215. Alternatively, the thickness of the light-blocking member 501 in the X direction may be identical with the distance between the ends of the substrate 301, when high heat dispersion properties are desired.

A method of manufacturing the magnetic reproduction head 1001 is discussed below. It is assumed here that the laser light source 401 is a GaAlInP semiconductor laser.

First, the laser light source 401 is formed on a substrate 301 made of n-type GaAs, by an MOCVD apparatus. Specifically, a buffer layer made of n-type GaInP and 300 nm thick is formed, and then a n-type AlGaInP clad layer 1 μm thick, an active layer made of GaInP and 60 nm thick, and a p-type AlGaInP clad layer 1.2 μm thick are formed. A part of the p-type AlGaInP clad layer is etched so that a striped ridge structure is formed thereon. Then a cap layer made of p-type GaInP and 200 nm thick is formed on the ridge structure. A region other than the ridge structure functions as a n-type GaAs blocking layer 700 nm thick. Formed on this layer are a contact layer made of p-type GaAs and a p-type electrode layer 402 constituted by a Zn/Au layer. On the other hand, Ge/Au is deposited on the n-type GaAs substrate 301, as an n-type electrode layer 403. It is noted that a known structure and a known manufacturing method of a semiconductor laser are used above. Then a magnetic sensor device 201 is formed on the substrate 301 in the same manner as the magnetic sensor device 1 of the first embodiment. Thereafter ABS sections 302 are formed by etching the surface of the substrate 301 which surface faces the magnetic recording medium. After this the magnetic reproduction head 1001 is completed.

Now the operation of the magnetic reproduction head 1001 is described. First, electricity is applied between the p-type electrode layer 402 and the n-type electrode layer 403, with the result that light beam 215 is generated from the laser light source 401. The optical axis of the light beam 215 is arranged at around the dielectric layer 212 which is formed between the magnetic layer 211 and the tip of the protruding section of the metal layer 213. The light beam 215 is applied to this area. In response to the application of the light beam 215, surface plasmons are diffused at the interface between the dielectric layer 212 and the metal layer 213 and reaches the surface (facing the magnetic recording medium) opposite to the surface to which the light beam 215 is applied, with the result that the concentration of plasmons (electric field) occurs around the tip of the protruding section of the metal layer 213. Because of this, near field light 216 which is smaller in size than the wavelength of the light beam 215 is generated around the tip of the protruding section of the metal layer 213, at the surface (facing the magnetic recording medium) opposite to the surface to which the light beam 215 is applied. At this moment the magnetic layer 211 facing the tip of the protruding section of the metal layer 213 with the dielectric layer 212 being interposed therebetween amplifies the intensity of the near field light 216 on account of mutual interaction (multiple interference) with the metal layer 213. The near field light 216 thus generated is applied to the magnetic recording medium so that the magnetic recording medium is heated, and magnetically-recorded information is detected by the magnetic sensing section 207 (more specifically, by the magnetization-free layer 206).

According to the present embodiment, a magnetic reproduction head in which the magnetic sensor device 201 is integrated with the laser light source 401 is realized as in the first embodiment. It is therefore possible to provide a very small magnetic reproduction head 1001 for photo-assisted reproduction, which can realize highly precise photo-assisted reproduction because of its extremely high precision of the positioning accuracy of the light beam 215 with respect to the magnetic sensor device 201.

Furthermore, since the aforesaid light-blocking member 501 is formed, temperature increase in the magnetic sensing section 207 is restrained and the light beam 215 is applied only to an area around the magnetic layer 211, the dielectric layer 212, and the metal layer 213, from which near field light 216 is generated. This makes it possible to realize efficient photo-assisted reproduction using near field light 216, without impairing the magnetic field detection capability of the magnetic sensing section 207.

The ABS sections 302 are formed on the substrate 301 in the manner as above, so that the substrate 301 can function as a slider of the magnetic reproduction head 1001. Attaching the magnetic reproduction head 1001 to the suspension arm of the hard disc device, it is possible to heat the magnetic recording medium in the hard disc device by near field light 216 generated from the magnetic sensor device 201, and hence photo-assisted reproduction using near field light 216 is realized.

As an alternative of the present embodiment, the substrate 301 may be a simple single-layer semiconductor substrate or may be constituted by plural semiconductor layers.

In the magnetic reproduction head 1001 of the present embodiment, the gap between the laser light source 401 and the magnetic sensor device 201 may be void or may be covered by a highly transmissive dielectric material typified by $SiO_2$, SiN, $Al_2O_3$, and AlN. Also, an optical waveguide may be formed along the path of the light beam 215.

Twelfth Embodiment

Figure 15:
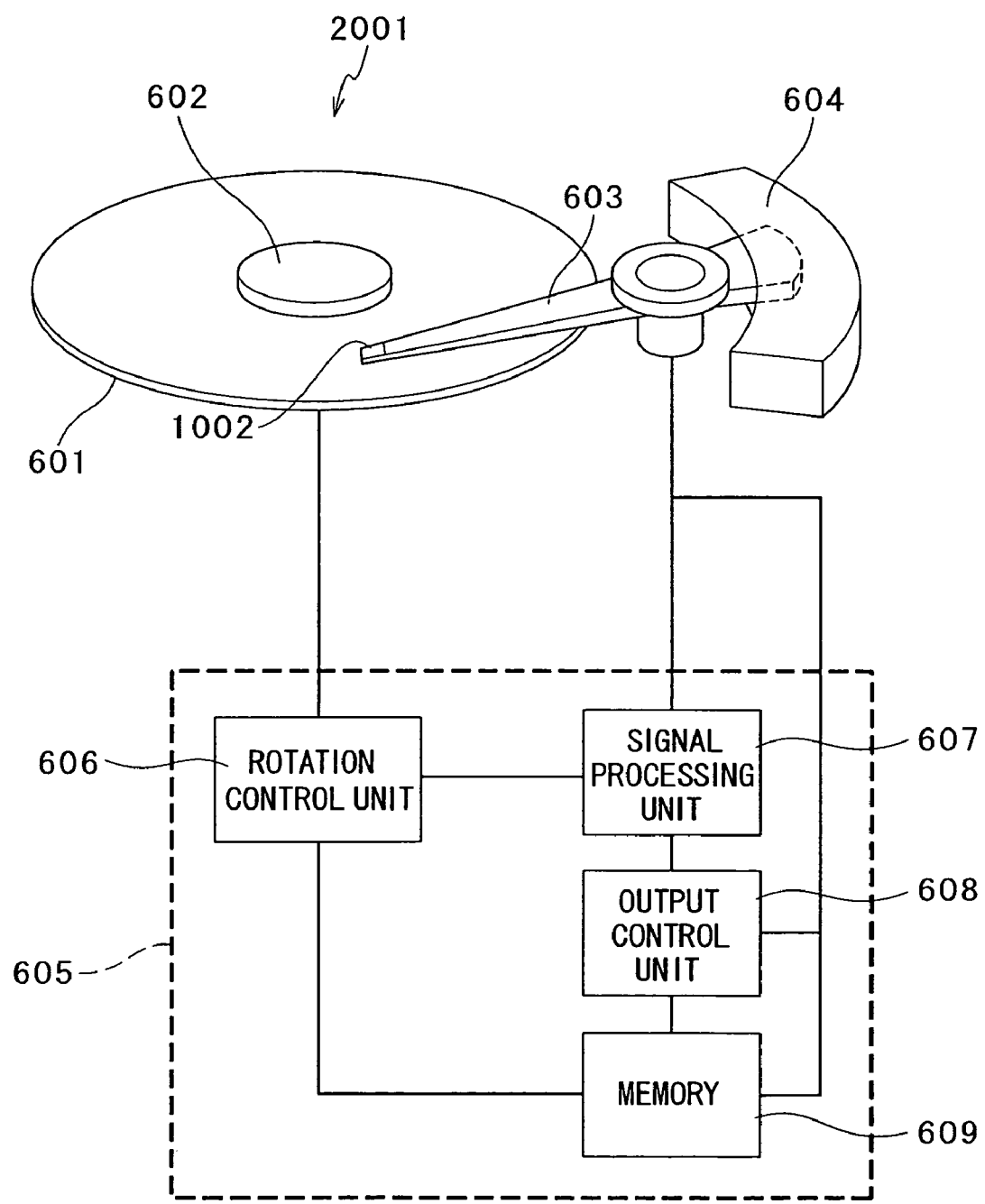
FIG. 15 is a schematic diagram of the magnetic reproducer of the twelfth embodiment of the present invention.

The following describes a magnetic reproducer of a twelfth embodiment of the present invention. FIG. 15 is a schematic diagram of the magnetic reproducer of the twelfth embodiment of the present invention.

The magnetic reproducer 2001 of the present embodiment includes: a magnetic reproduction head 1002 identical with that of the eleventh embodiment; a disc-shaped magnetic recording medium 601; a spindle 602 which is provided to rotate the magnetic recording medium 601; a suspension arm 603 which supports and fixes the magnetic reproduction head 1002; a voice coil motor 604 which moves the suspension arm 603 on the magnetic recording medium 601; and a control circuit 605 which controls these components. The control circuit 605 includes: a rotation control unit 606 which controls the rotation of the spindle 602; a signal processing unit 607 which sends and receives a signal to/from the magnetic reproduction head 1002; an output control unit 608 which controls the output from a light source formed in the magnetic reproduction head 1002; and a memory 609 which stores information read out from the recording medium. Except the magnetic reproduction head 1002 the components above are used in a known hard disc.

In the magnetic reproduction head 1002, a magnetic sensor device is arranged such that, in relation to the moving direction of the medium, the magnetic sensing section is behind the area where near field light is generated. This arrangement allows the heated area of the magnetic recording medium 601 to efficiently move to the point immediately below the magnetic sensing section (more specifically, immediately below the magnetization-free layer), during photo-assisted reproduction.

The magnetic recording medium 601 may be constructed in such a way that TbFeCo which is a ferrimagnetic material and 50 nm thick is deposited as a recording layer on a disc-shaped glass substrate. The composition of TbFeCo is adjusted so that photo-assisted reproduction is performable, e.g. the composition is adjusted so that the compensation temperature with which the coersivity $H_c$ at room temperatures is not lower than 10 kOe and the total magnetization is substantially zero is achieved. The composition is also adjusted so that the Curie point at which the magnetization is lost is about 200° C. On the recording layer of the magnetic recording medium 601, a C film about 5 nm thick is formed to protect the recording layer, and a lubricant is further applied to attain the thickness of 1 nm.

The revolution of the spindle 602 is arbitrarily determined on condition that recording and reproduction are stably performed. For example, the revolution falls within the range of 1800 rpm to 7200 rpm.

Now the operation of the magnetic reproducer 2001 is described. When power is turned on, the magnetic reproduction head 1002 hovers on the magnetic recording medium 601 at the height of about 5 to 10 nm above the medium, by air flow generated by the rotation of the spindle 602. Then electricity is supplied to the laser light source of the magnetic reproduction head 1002 so that light beam is generated, and this light beam is applied to the magnetic sensor device of the magnetic reproduction head 1002. As a result the magnetic sensor device generates near field light which is smaller in size than the wavelength of the light beam. At this moment the output control unit 608 in the control circuit 605 adjusts the output of the laser light source of the magnetic reproduction head 1002, for the purpose of achieving high reproduction signal quality. As the near field light is applied to the magnetic recording medium 601, the recording layer of the magnetic recording medium 601 is locally heated so that a leakage magnetic field is generated only from magnetic bits at the heated area. As the magnetic recording medium 601 moves, the heated area on the magnetic recording medium 601 which is locally heated by the near field light moves to the position immediately below the magnetic sensing section which is behind the area where the near field light is generated in the magnetic reproduction head 1001, in relation to the traveling direction of the medium. The leakage magnetic field from the information recording area is detected by a magnetization-free layer of the magnetic sensing section. The detected leakage magnetic field is converted to an electric signal so that recorded information is read out. After this the reproduction of the magnetically-recorded information is finished.

According to the present embodiment, effects similar to those of the magnetic reproduction head 1001 of the eleventh embodiment are exerted. In addition, the heated area of the magnetic recording medium 601 is efficiently moved to the position immediately below the magnetic sensor device of the magnetic reproduction head 1002. It is therefore possible to provide a magnetic recorder/reproducer 2001 which is capable of performing efficient photo-assisted reproduction and high-density magnetic recording.

EXAMPLES

Now examples of the present invention are presented. Performed in the examples were simulations of devices having the same configurations as the magnetic sensor devices of the first to seventh embodiments. The methods and results of the simulations are described below. Each of the devices used in the simulations in the respective examples is configured to be identical with one of the magnetic sensor devices of the respective embodiments. For this reason the same components may be referred to by the same reference numerals for the sake of convenience.

Example 1

Figure 16:
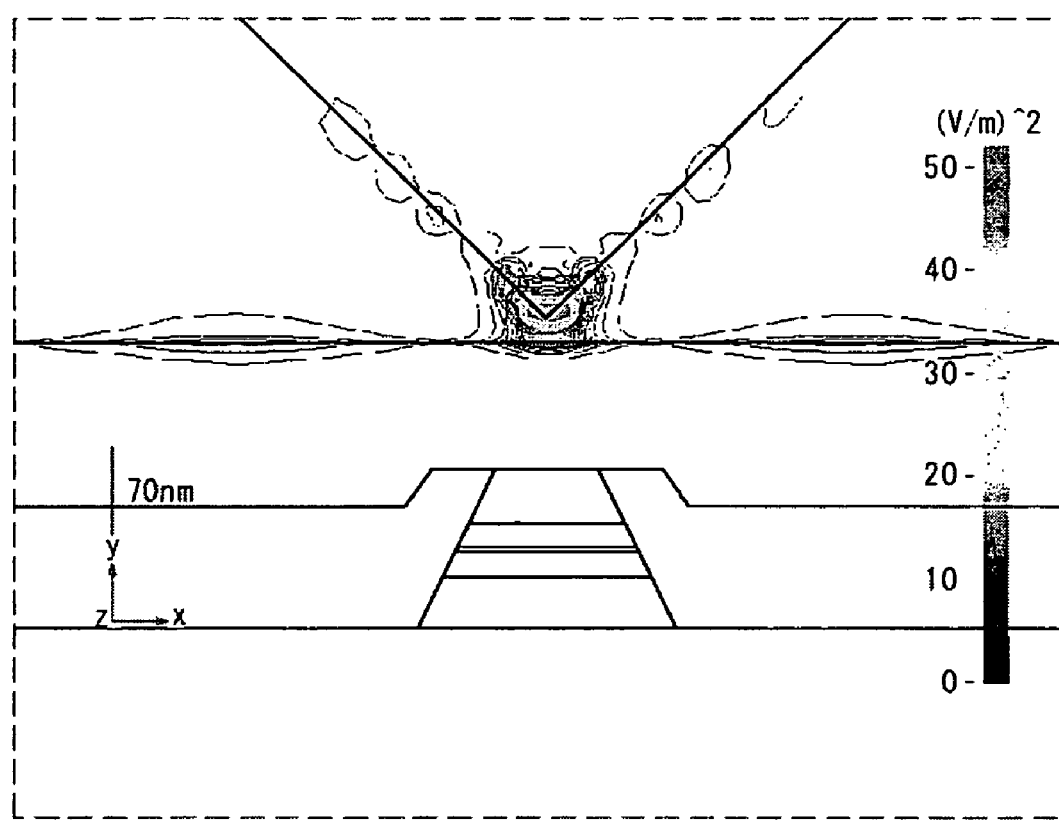
FIG. 16 shows a result of a simulation regarding an example 1 of the present invention.

The target of a simulation was a device having the same configuration as the magnetic sensor device 1 of the first embodiment, shown in FIG. 1. In this example the electric field intensity on the surface facing the magnetic recording medium, when light beam 15 having the wavelength of 680 nm was applied to around the tip of the protruding section of the metal layer 13, was simulated using the FDTD (Finite Difference Time Domain) method. A result is shown in FIG. 16. The simulation assumed that the intensity distribution of the light beam 15 was Gaussian and the spot diameter was 700 nm. The incident light was polarized in the Y direction in FIG. 16. The peak intensity of the electric field of the light beam 15 was arranged to be $1 (V/m)^2$. The distance between the tip of the protruding section of the metal layer 13 and the magnetic layer 11 was arranged to be 25 nm.

As shown in FIG. 16, because of the application of the light beam 15, on the medium-facing surface (which was opposite to the surface on which the light beam 15 is incident) the concentration of electric fields occurred at around the tip of the protruding section of the metal layer 13, and the electric field intensity was enhanced by mutual interaction (multiple interference) with the magnetic layer 11. As a result the obtained electric field intensity was higher than $50 (V/m)^2$, and this was significantly higher than the electric field peak intensity of the light beam 15. Such an electric field with high intensity was observed only within a close range distanced about several tenth of nanometers from the tip of the protruding section of the metal layer 13. This indicates that the electric field above was near field light.

In this way, the electric field intensity higher than the intensity of the incident light beam 15 was obtained when the near field light generation section 14 of the magnetic sensor device 1 was constructed by successively depositing the magnetic layer 11, the dielectric layer 12, and the metal layer 13. Such a magnetic sensor device 1 can be manufactured by a thin film formation method and photolithography, by which the tip of the protruding section of the metal layer 13 is highly precisely aligned with the center of the magnetic sensing section 7 in relation to the track width direction (i.e. the X direction in FIG. 1 and FIG. 16).

Example 2

Figure 17:
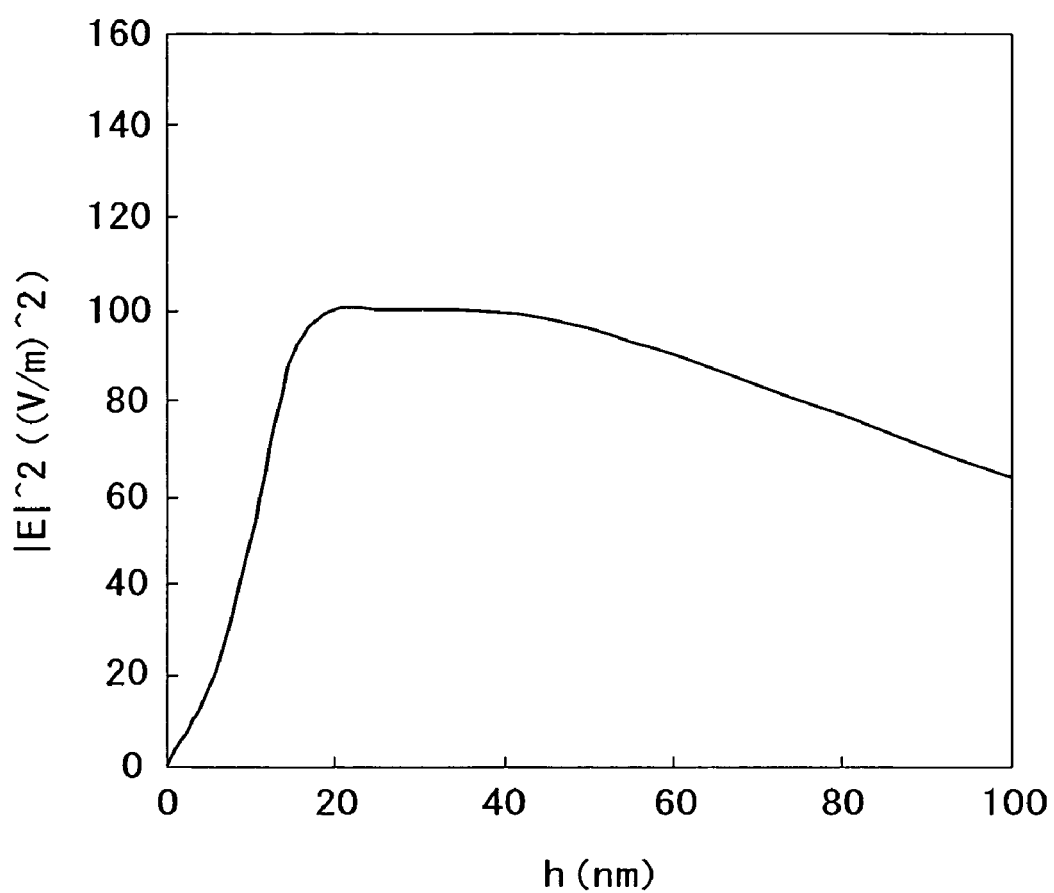
FIG. 17 shows a result of a simulation regarding an example 2 of the present invention.

A simulation using the FDTD method was carried out regarding a change in the electric field intensity when the distance between the metal layer 13 and the magnetic layer 11 was changed in a device having the same configuration as the magnetic sensor device 1 of the first embodiment shown in FIG. 1. The result of the simulation is shown in FIG. 17. In FIG. 17, the horizontal axis indicates the distance h between the tip of the protruding section of the metal layer 13 and the magnetic layer 11, whereas the vertical axis indicates the electric field intensity on the surface facing the magnetic recording medium.

The conditions other than a change in the distance between the metal layer 13 and the magnetic layer 11 were identical with the simulation conditions in the example 1. It seems desirable that the distance between the tip of the protruding section of the metal layer 13 and the magnetic layer 11 is about 100 nm or less, in consideration of preventing a transmissive light component (far field component) of light beam 15 from passing through the areas around the metal layer 13 and for closing the distance between the near field light 16 and the magnetic sensing section 7. Taking account of this point, in the present example a simulation was carried out on condition that the distance between the tip of the protruding section of the metal layer 13 and the magnetic layer 11 is not longer than 100 nm.

As illustrated in FIG. 5, as the distance between the tip of the protruding section of the metal layer 13 and the magnetic layer 11 was reduced from 100 nm, the electric field intensity was enhanced on account of mutual interaction (multiple interference) occurring between the tip of the protruding section of the metal layer 13 and the magnetic layer 11. A high electric field intensity of about $100 (V/m)_2$ was obtained when the distance was about 20 nm. When the distance between the tip of the protruding section of the metal layer 13 and the magnetic layer 11 became shorter than 20 nm, the thickness of the dielectric layer 12 was reduced and hence surface plasmons did not easily diffuse, with the result that the obtained electric field intensity was small, However, the obtained electric field intensity was sufficiently higher than the electric field intensity (1 (V/m)$^2$) of the light beam 15, when the distance was not shorter than 5 nm.

It is therefore possible to obtain highly intense near field light 16 when the distance between the tip of the protruding section of the metal layer 13 and the magnetic layer 11 falls within the range of about 5 nm to 100 nm. The distance desirably falls within the range of 15 nm to 50 nm because the effect of amplification of the intensity of the electric field on account of mutual interaction (multiple interference) between the metal layer 13 and the magnetic layer 11 is particularly great at this range.

Example 3

A simulation using the FDTD method was carried out regarding a device having the same configuration as the magnetic sensor device 21 of the second embodiment shown in FIG. 3, on the same conditions as the example 1. That is to say, simulated was the electric field intensity on the surface facing the magnetic recording medium, when light beam 15 having the wavelength of 680 nm was applied to around the tip of the protruding section of the metal layer 33. The result is shown in FIG. 18.

In the same manner as the example 1, the simulation assumed that the intensity distribution of the light beam 35 was Gaussian and the spot diameter was 700 nm. The incident light was polarized in the Y direction in FIG. 18. The peak intensity of the electric field of the light beam 35 was arranged to be 1 (V/m)$^2$. The distance between the tip of the protruding section of the metal layer 33 and the magnetic layer 31 was arranged to be 25 nm.

Figure 18:
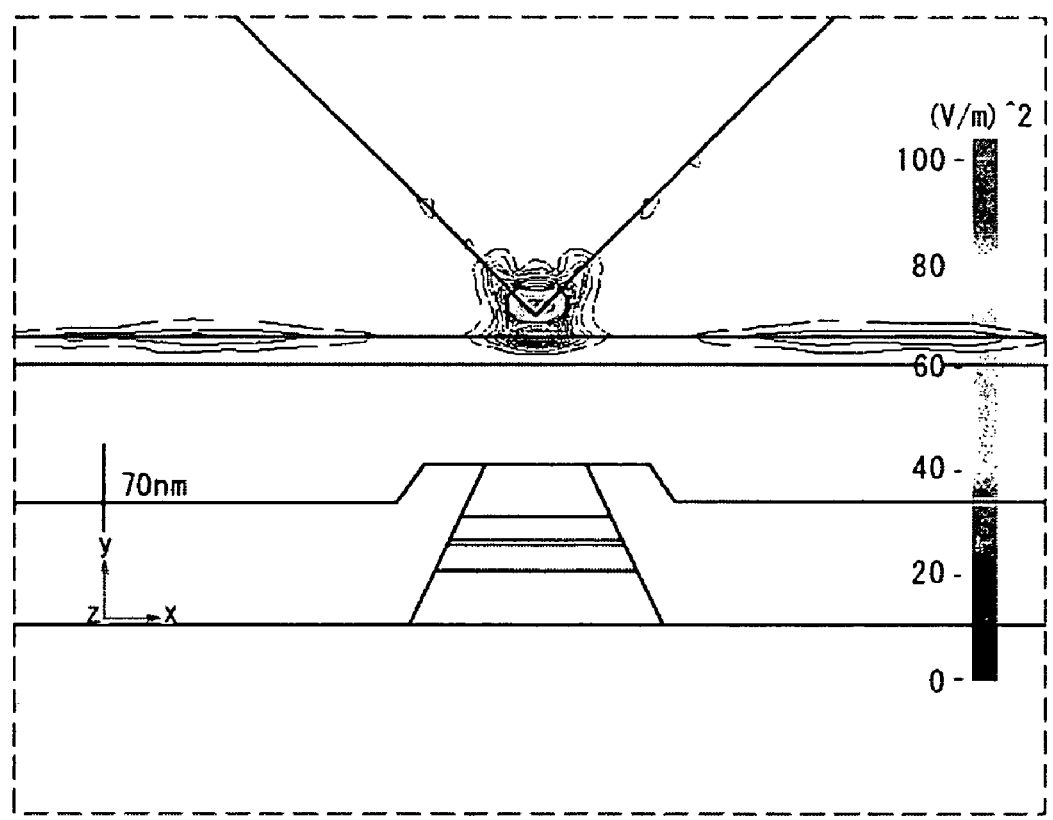
FIG. 18 shows a result of a simulation regarding an example 3 of the present invention.

As illustrated in FIG. 18, the concentration of the electric field occurred around the tip of the protruding section of the metal layer 33, in response to the application of light beam. The obtained electric field intensity was 100 (V/m)$^2$, and this was higher than the electric field peak intensity obtained in the first embodiment. As such, it was proved that higher electric field concentration than the magnetic sensor device 1 of the first embodiment was obtained when the metal layer 37 is arranged to be in contact with the dielectric layer 32 as in the case of the magnetic sensor device 21 of the second embodiment.

Example 4

Figure 19:
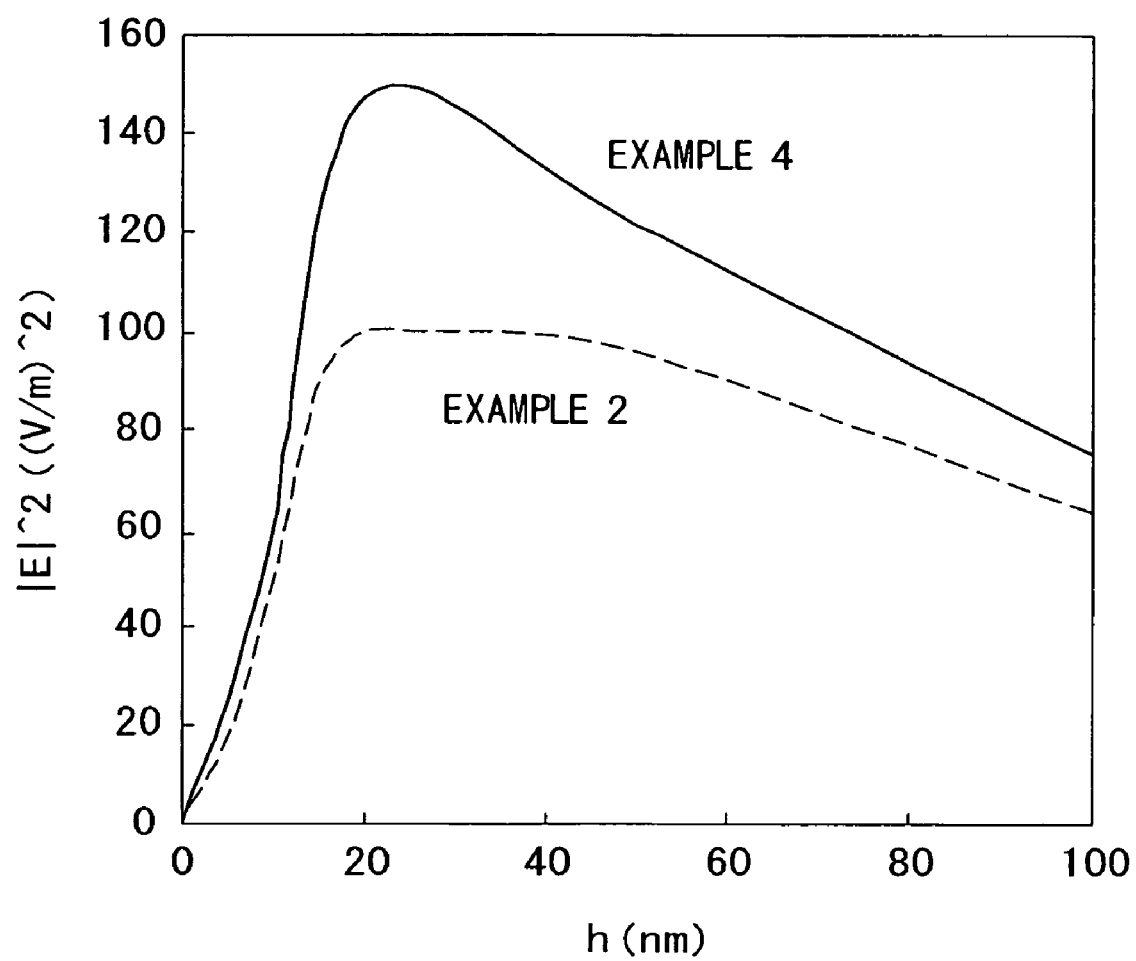
FIG. 19 shows a result of a simulation regarding an example 4 of the present invention.

A simulation using the FDTD method was carried out regarding a change in the electric field intensity in accordance with a change in the distance between the metal layer 33 and the metal layer 37, in a device having the same configuration as the magnetic sensor device 21 of the second embodiment shown in FIG. 3. The result of the simulation is shown in FIG. 19. In FIG. 19, the horizontal axis indicates the distance h between the tip of the protruding section of the metal layer 33 and the metal layer 37, whereas the vertical axis indicates the electric field intensity on the surface facing the magnetic recording medium. FIG. 19 also shows the result of the example 2. The conditions other than a change in the distance between the metal layer 33 and the metal layer 37 are identical with the simulation conditions of the example 3.

As shown in FIG. 19, it was proved that an electric field intensity higher than that of the first embodiment was obtained when the distance between the tip of the protruding section of the metal layer 33 and the metal layer 37 falls within the range of not shorter than 2 nm and not longer than 100 nm, and an electric field enhancement effect was higher than the example 2 when the metal layer 37 was formed to be in contact with the magnetic layer 31. This is because, since the metal layer 37 does not absorb plasmons so much and hence can efficiently generate and diffuse surface plasmons, the effect of amplification of plasmons is enhanced and highly intense near field light is obtained. It was also proved that the electric field intensity was higher than the highest value in the example 2, when the distance between the tip of the protruding section of the metal layer 33 and the metal layer 37 fell within the range of not shorter than 15 nm and not longer than 70 nm. Therefore this range of not shorter than 15 nm and not longer than 70 nm is particularly preferable.

Example 5

Figure 20:
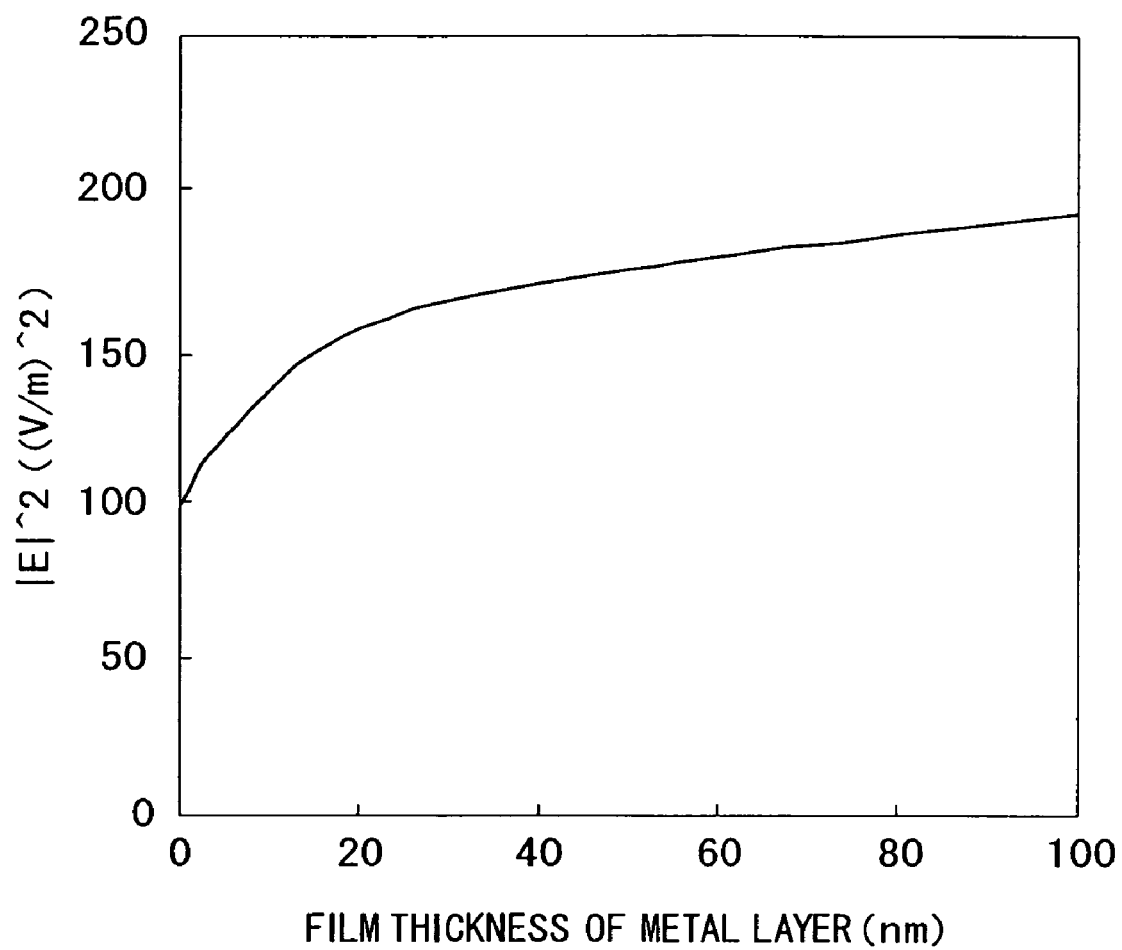
FIG. 20 shows a result of a simulation regarding an example 5 of the present invention.

A simulation using the FDTD method was carried out regarding the relationship between the thickness of the metal layer 37 and the electric field intensity, in a device having the same configuration as the magnetic sensor device 21 of the second embodiment shown in FIG. 3. The result is shown in FIG. 20. It is noted that the conditions in this example are identical with the simulation conditions in the example 3, except a change in the thickness of the metal layer 37.

As illustrated in FIG. 20, an electric field intensity higher than that of the example 1 in which no metal layer 37 was provided (i.e. the thickness is 0 nm) was obtained when the thickness of the metal layer 37 was 2 nm or more. It is considered that the thickness of the metal layer 37 is preferably 100 nm or less in consideration of arranging the near field light source and the magnetic sensing section 27 to locate within the range of near field light. Therefore the thickness preferably falls within the range of about 2 nm to 100 nm.

Example 6

A simulation using the FDTD method was carried out on the same conditions as the example 1, in a device having the same configuration as the magnetic sensor device 41 of the second embodiment shown in FIG. 4. The result is shown in FIG. 21.

In the same manner as the example 1, the simulation assumed that the intensity distribution of the light beam 55 was Gaussian and the spot diameter was 700 nm. The incident light was polarized in the Y direction in FIG. 21. The peak intensity of the electric field of the light beam 55 was arranged to be 1 (V/m)$^2$.

Figure 21:
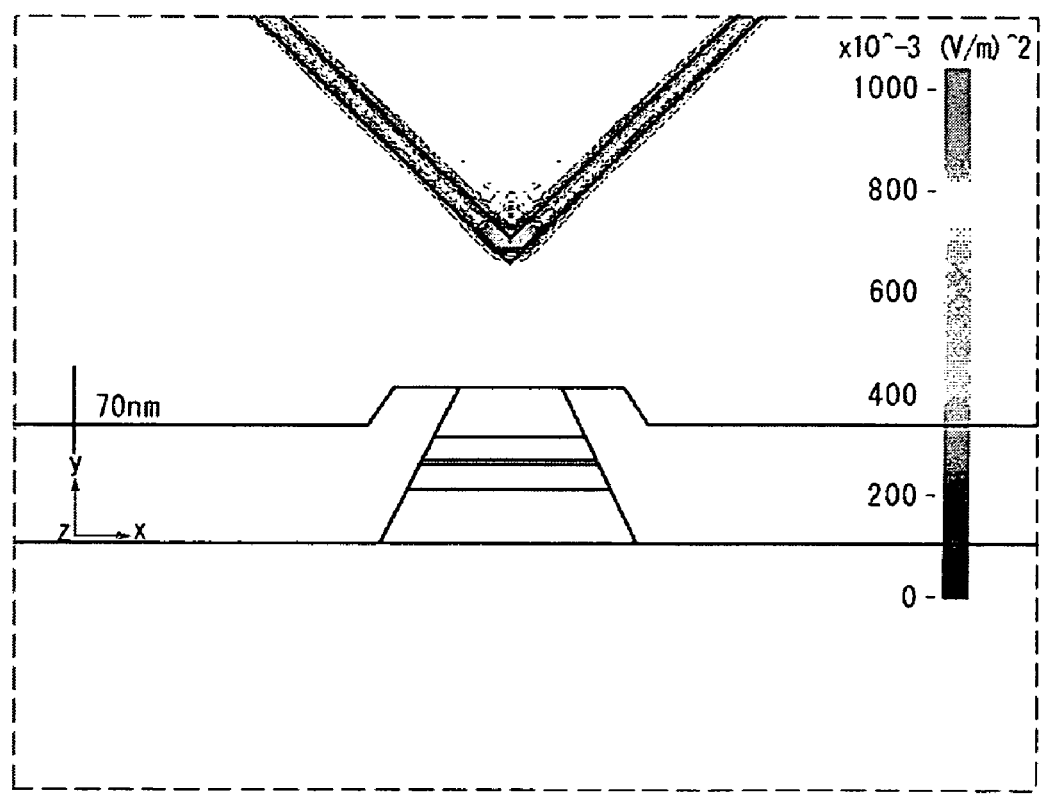
FIG. 21 shows a result of a simulation regarding an example 6 of the present invention.

As shown in FIG. 21, on account of the application of light beam, the electric field concentration occurred around the tip of the protruding section of the metal layer 53 and an electric field intensity of higher than 1 (V/m)$^2$ which was the electric field intensity of the light beam 55 was obtained, the electric field is enclosed between the metal layer 53 and the magnetic layer 51, and the intensity was enhanced to be higher than the peak intensity of the light beam 55.

The electric field intensity obtained in this example was lower than the values obtained in the examples 1 to 5 in regard of devices each having the same configuration as the magnetic sensor of the first or second embodiment. However, the upper part of the magnetic layer 51 had a concave shape fitting into the protruding section of the metal layer 53, and hence the area in which the electric field was enclosed was smaller than those of the examples 1 to 5. For this reason it was acknowledged that the electric field concentration occurred in an area which was extremely small particularly in the track width direction (X direction in FIG. 21). In other words, near field light 56 in this example was smaller in size than those of the examples 1 to 5 in regard of devices each having the same configuration as the magnetic sensor of the first or second embodiment.

For the reason above, when photo-assisted reproduction is performed with the use of the magnetic sensor device 41 of the third embodiment in a magnetic reproduction head, the magnetic recording medium is more locally heated, in addition to the effects of the magnetic sensor devices 1 and 21 of the first and second embodiments. This makes it possible to reproduce magnetically-recorded information with higher resolution.

Example 7

A simulation using the FDTD method was carried out on the same conditions as the example 1 except that the thickness of the metal layer 77 was arranged to be 20 nm, in a device having the same configuration as the magnetic sensor device 61 of the fourth embodiment shown in FIG. 5. The result of the simulation is shown in FIG. 22.

Figure 22:
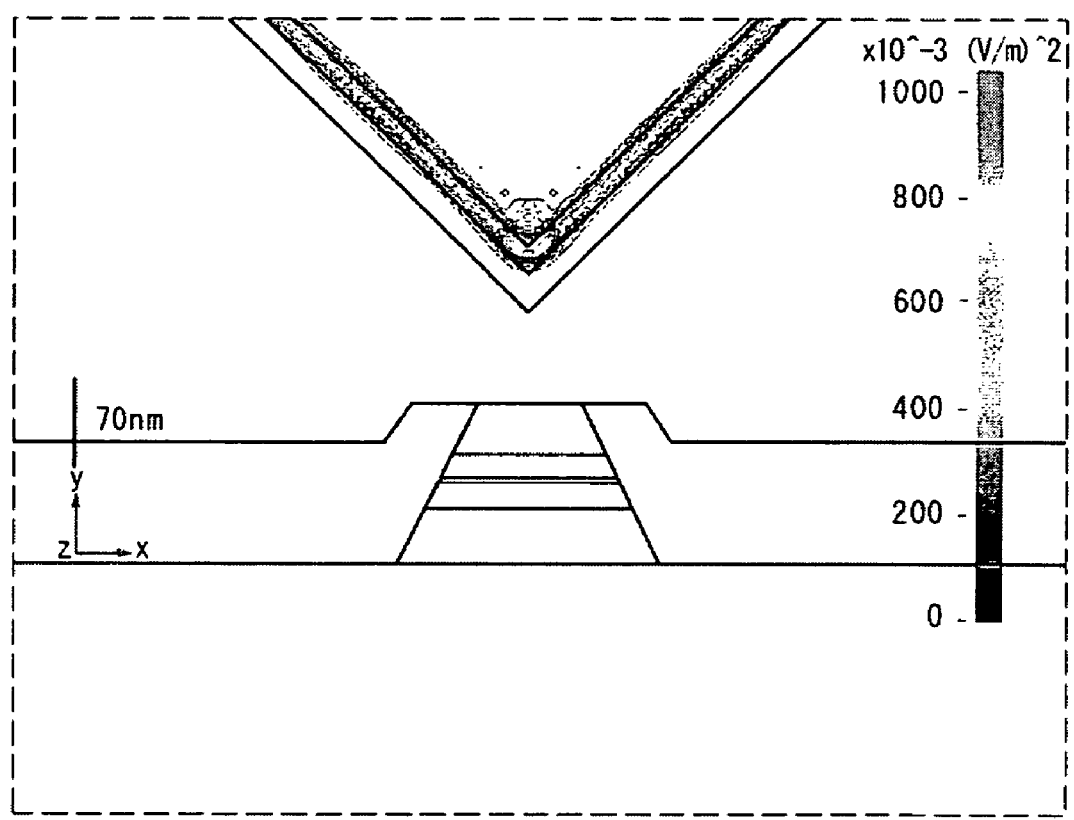
FIG. 22 shows a result of a simulation regarding an example 7 of the present invention.

As illustrated in FIG. 22, an electric field intensity of higher than 1 $(V/m)^2$ which was the electric field intensity of the light beam 75 was obtained in the same manner as the example 6, in a device configured to the identical with the magnetic sensor device 1 of the fourth embodiment, which includes the metal layer 77. An electric field was enclosed between the metal layer 73 and the magnetic layer 71, and hence the intensity was enhanced to be higher than the peak intensity of the light beam 75.

Furthermore, being similar to the example 6, the upper part of the magnetic layer 71 had a concave shape fitting into the protruding section of the metal layer 73, and hence the area in which the electric field was enclosed was smaller than those of the examples 1 to 5 in regard of devices each having the same configuration as the magnetic sensor of the first or second embodiment. It was therefore acknowledged that the electric field concentration occurred in an area which was extremely small particularly in the track width direction (X direction in FIG. 22). In other words, near field light 76 in this example is smaller in size than those in the examples 1 to 5 in regard of devices each having the same configuration as the magnetic sensor of the first or second embodiment.

Example 8

A simulation using the FDTD method was carried out on the same conditions as the example 1, in a device having the same configuration as the magnetic sensor device 81 of the fifth embodiment shown in FIG. 6. The result of the simulation is shown in FIG. 23.

In the same manner as the example 1, the simulation assumed that the intensity distribution of the light beam 95 was Gaussian and the spot diameter was 700 nm. The incident light was polarized in the Y direction in FIG. 23. The peak intensity of the electric field of the light beam 95 was arranged to be 1 $(V/m)^2$. The length (width) of the dielectric layer 92 was arranged to be 60 nm in relation to the X direction and the length (height) of the same was arranged to be 1 nm in relation to the Y direction. The thickness of the metal layer 93 was arranged to be 20 nm.

Figure 23:
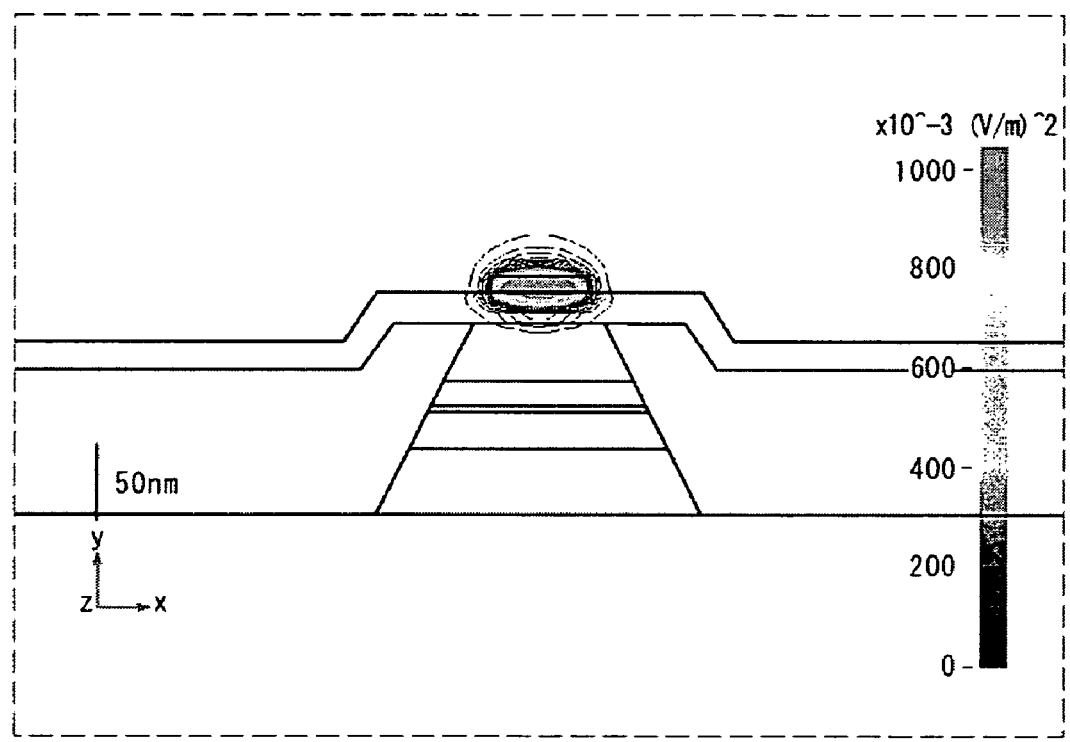
FIG. 23 shows a result of a simulation regarding an example 8 of the present invention.

As illustrated in FIG. 23, electric field amplification occurred due to mutual interaction (multiple interference) between the magnetic layer 91 and the metal layer 93, in response to the application of light beam, and an electric field intensity higher than 1 $(V/m)^2$ which was the electric field peak intensity of the light beam 95 was obtained in the dielectric layer 92.

Example 9)

The target of a simulation was a device having the same configuration as the magnetic sensor device 81 of the fifth embodiment, shown in FIG. 6. Simulated in this example was a change in the electric field intensity (on the medium-facing surface) when the length (height) h in relation to the Y direction and the length (width) w in relation to the X direction of the dielectric layer 92 were changed. The conditions other than changes in the length (height) h in relation to the Y direction and the length (width) w in relation to the X direction of the dielectric layer 92 were identical with the simulation conditions in the example 8.

Figure 24:
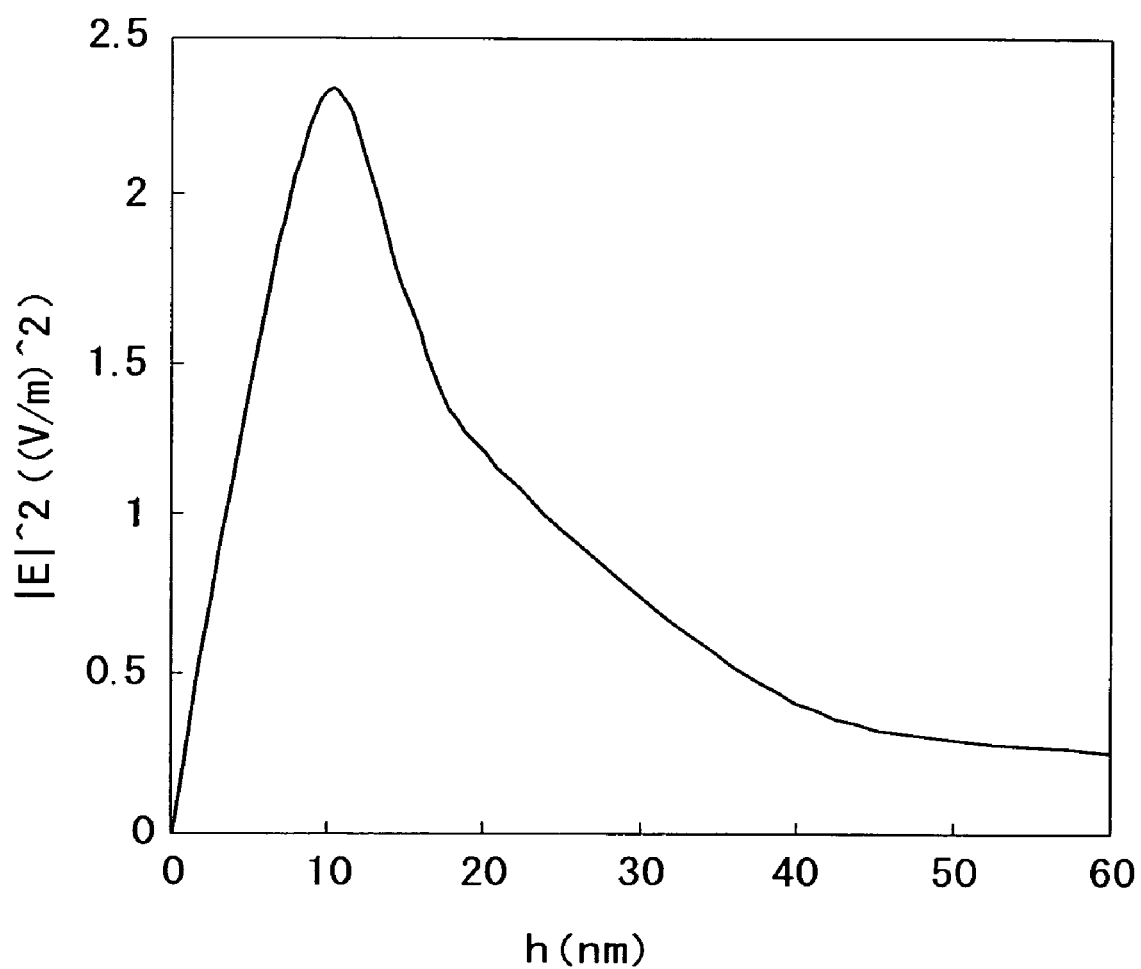
FIG. 24 shows a result of a simulation regarding an example 9 of the present invention, when the length (height) h in relation to the Y direction of a dielectric layer dielectric layer is changed.

FIG. 24 shows a result of the simulation when the aforesaid length (height) h in relation to the Y direction of the dielectric layer 92 was changed. The length (width) w in relation to the X direction of the dielectric layer 92 was set at 60 nm in this case. As illustrated in FIG. 24, when the length (height) h in relation to the Y direction of the dielectric layer 92 fell within the range of not shorter than 5 nm and not longer than 20 nm, the electric field intensity exceeded the peak intensity of the light beam 95, i.e. exceeded 1 $(V/m)^2$, and the enhancement effect was observed on account of the enclosure of the electric field between the magnetic layer 91 and the metal layer 93. This proves that it is particularly preferable to arrange the length (height) h in relation to the Y direction of the dielectric layer 92 to fall within the range of not shorter than 5 nm and not longer than 20 nm.

Figure 25:
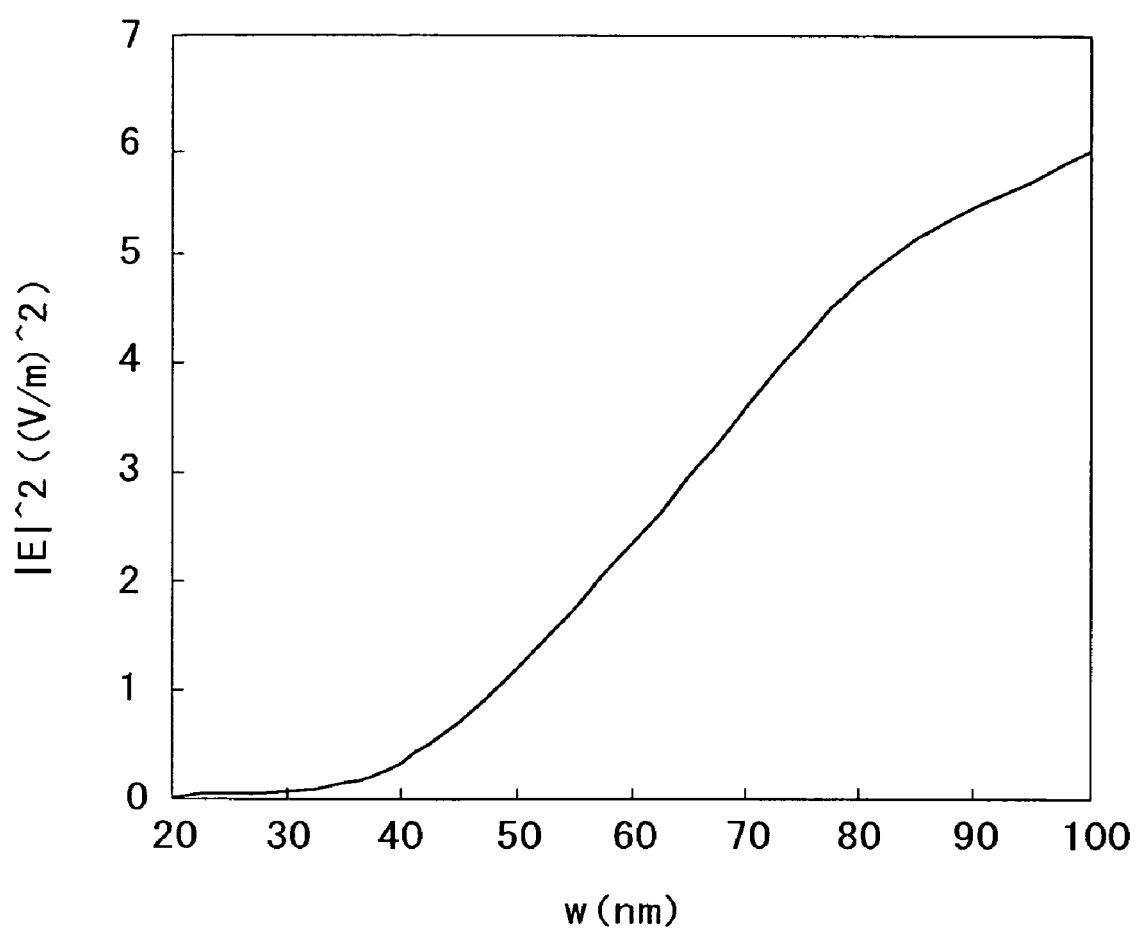
FIG. 25 shows a result of a simulation regarding an example 9 of the present invention, when the length (width) w in relation to the X direction of a dielectric layer is changed.

FIG. 25 shows the result of the simulation when the length (width) w in relation to the X direction of the dielectric layer 92 was changed. The length (height) in relation to the Y direction of the dielectric layer 92 was set at 10 nm in this case. As illustrated in FIG. 25, when the length (width) w in relation to the X direction of the dielectric layer 92 was not shorter than 50 nm, the electric field intensity exceeded the peak intensity of the light beam 95, i.e. exceeded 1 $(V/m)^2$, and the effect of enhancement of the electric field was observed. When the length (width) w in relation to the X direction of the dielectric layer 95 exceeds 100 nm, the area where near field light is generated is wider than the magnetic sensing section 87, and photo-assisted reproduction may be erroneously performed on a neighboring track. Therefore it is particularly preferable that the length (width) w in relation to the X direction of the dielectric layer 92 falls within the range of not shorter than 50 nm and not longer than 100 nm.

Example 10

Figure 26:
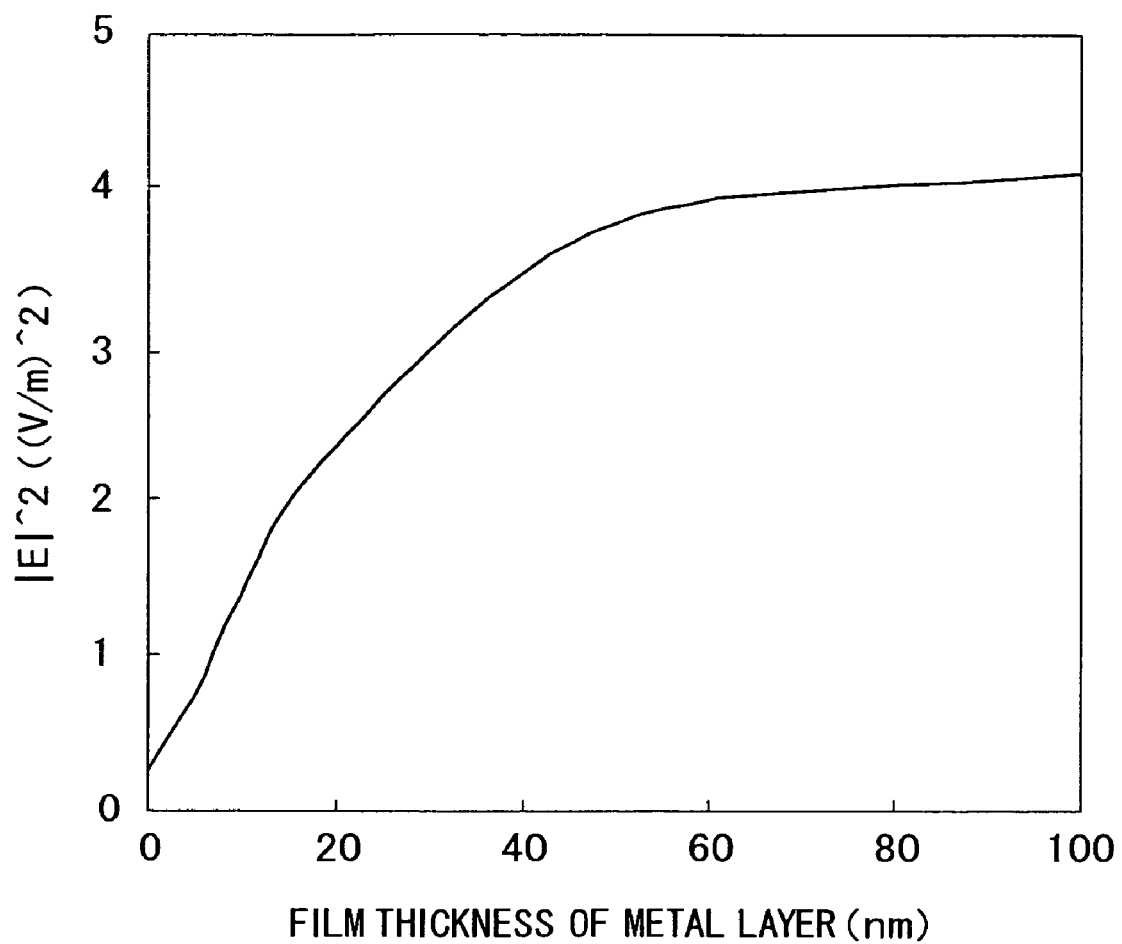
FIG. 26 shows a result of a simulation regarding an example 10 of the present invention.

A simulation was carried out regarding the relationship between the thickness of the metal layer 93 and the electric field intensity, in a device having the same configuration as the magnetic sensor device 81 of the fifth embodiment shown in FIG. 6. The result of the simulation is shown in FIG. 26. It is noted that the conditions other than a change in the thickness of the metal layer 93 were identical with the simulation conditions of the example 8.

As shown in FIG. 26, an intensity exceeding the electric field peak intensity of the light beam 95, i.e. exceeding 1 $(V/m)^2$, was obtained when the thickness of the metal layer 93 of the magnetic sensor device 81 of the fifth embodiment was 8 nm or more. It is considered that the thickness of the metal layer 93 is preferably 100 nm or less in consideration of arranging the near field light source and the magnetic sensing section 87 to locate within the range of near field light. Therefore the thickness preferably falls within the range of about 8 nm to 100 nm.

Example 11

A simulation was carried out on the same conditions as the example 8, in a device having the same configuration as the magnetic sensor device 101 of the sixth embodiment shown in FIG. 8. The result of the simulation is shown in FIG. 27.

Figure 27:
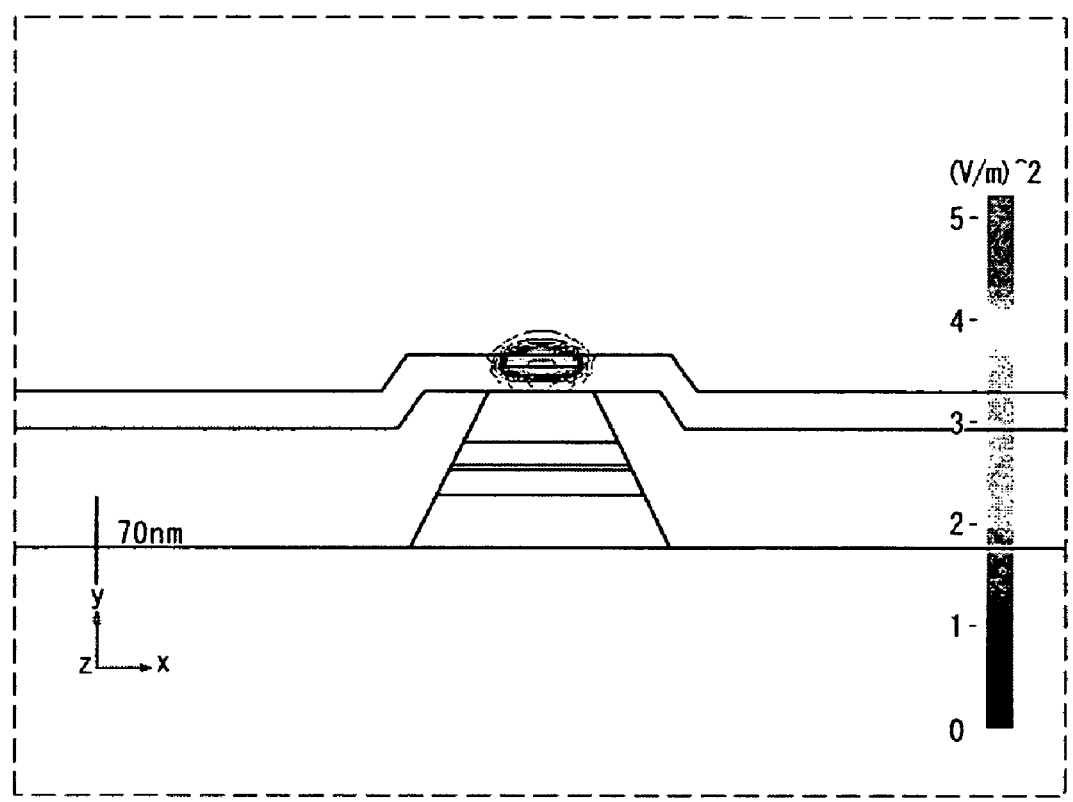
FIG. 27 shows a result of a simulation regarding an example 11 of the present invention.

As shown in FIG. 27, in the same manner as the magnetic sensor device 101 of the sixth embodiment, an electric field intensity of higher than 5 $(V/m)^2$ was obtained when the metal layer 113 was formed to be further in contact with the flank of the dielectric layer 112. It was therefore proved that the amplification effect in this example was higher than the case where the metal layer was in contact with only the bottom surface of the dielectric layer 112 (the electric field intensity in this case was about 2 $(V/m)^2$).

Example 12

A simulation was carried out on the same conditions as the example 8, in a device having the same configuration as the magnetic sensor device 121 of the seventh embodiment shown in FIG. 9. The result of the simulation is shown in FIG. 28.

Figure 28:
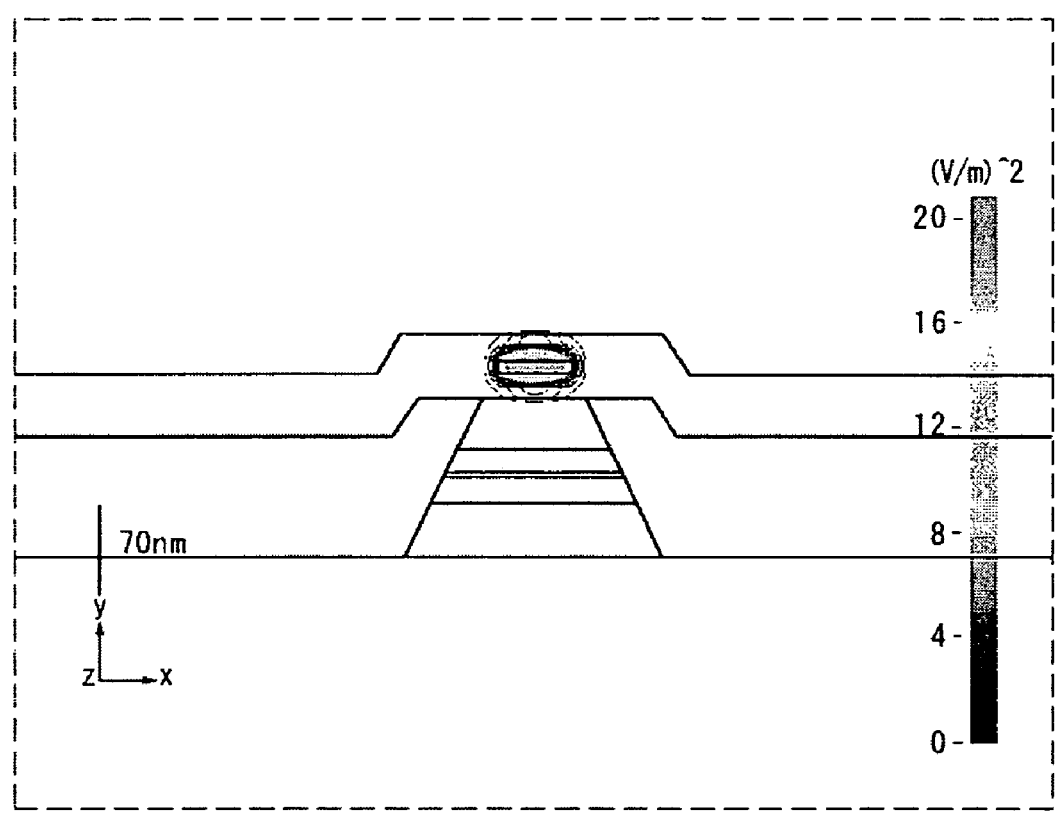
FIG. 28 shows a result of a simulation regarding an example 12 of the present invention.

As illustrated in FIG. 28, in the same manner as the magnetic sensor device 121 of the seventh embodiment, an electric field intensity of higher than 20 $(V/m)^2$ was obtained when the dielectric layer 132 was enclosed by the metal layer 133 and the metal layer 137. It was therefore proved that the amplification effect in this example was higher than the case of contact with only the bottom surface (the electric field intensity in this case was about 2 $(V/m)^2$) and the case of the example 11 where the metal layer 113 was arranged to further in contact with the flank of the dielectric layer 112.

Example 13

A simulation was carried out on the same conditions as the example 8, in a device having the same configuration as the magnetic sensor device 141 of the seventh embodiment shown in FIG. 10. The result of the simulation is shown in FIG. 29.

Figure 29:
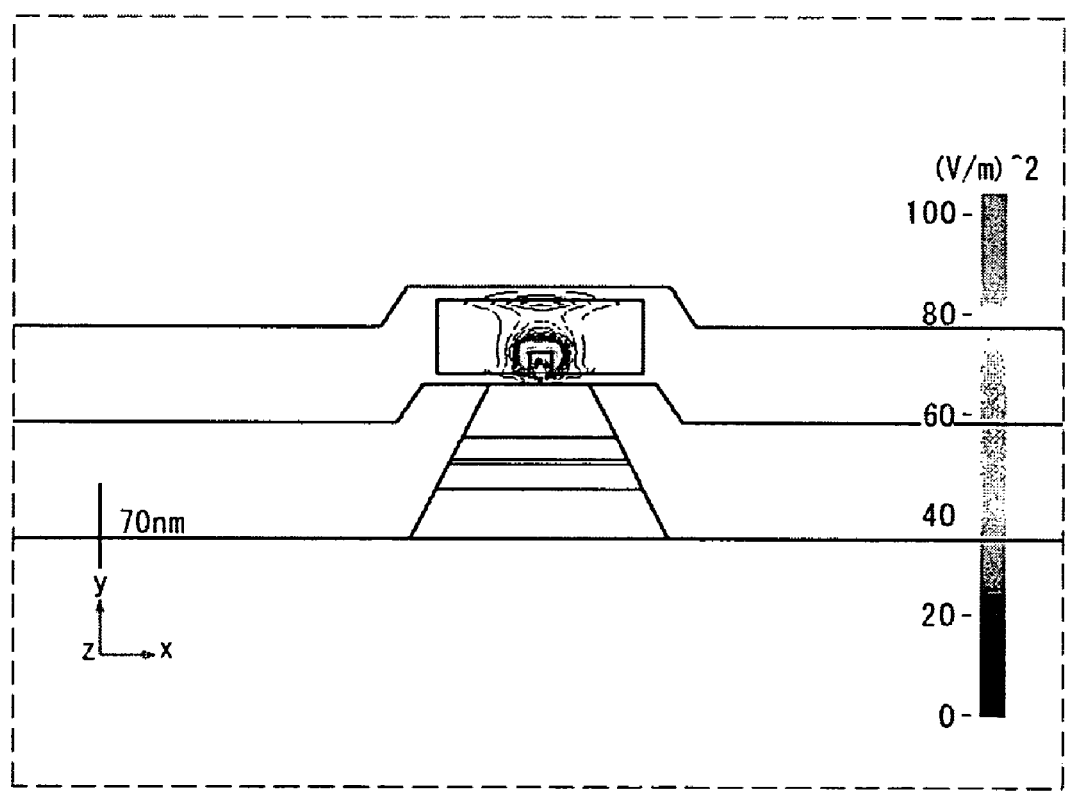
FIG. 29 shows a result of a simulation regarding an example 13 of the present invention.

The result shown in FIG. 29 indicates that a significantly high electric field intensity of higher than 100 $(V/m)^2$ was obtained and the electric field was concentrated into an extremely small area.

While this invention has been described in conjunction with the specific embodiments outlined above, it is evident that many alternatives, modifications and variations will be apparent to those skilled in the art. Accordingly, the embodiments and examples of the invention as set forth above are intended to be illustrative, not limiting. Various changes may be made without departing from the spirit and scope of the invention as defined in the following claims. For example, as a non-illustrated modification of the eleventh and twelfth embodiments, the magnetic sensor device of each of the second to tenth embodiments may be used in place of the magnetic sensor device of each of the eleventh and twelfth embodiments.

The fifth to seventh embodiments assume that the cross section of the dielectric layer has a rectangular shape, but the cross section may have another kind of shape. Examples of the shape include triangle and trapezium. In addition to the above, an alternative arrangement is that a dielectric layer having the same shape as the dielectric layer 152 embedded in the metal layer 153 in the eighth embodiment shown in FIG. 10 is provided concurrently with a metal layer having the same configuration as the metal layer 153.

In each of the embodiments, the magnetic reproduction sensor is not necessarily manufactured by the aforesaid method. Any types of methods may be adopted as long as the configuration recited in each embodiment is obtained. For example, in the manufacturing method of the magnetic reproduction sensor in each of the embodiments above, the order of forming the magnetic sensing section and the near field light generation section (constituted by the magnetic layer, the dielectric layer, and the metal layer (and another metal layer in some embodiments)) generating near field light may be reversed. In other words, the near field light generation section is formed first and then the magnetic sensing section is formed. In this regard, for the purpose of allowing the heated area of the magnetic recording medium, which is heated by near field light, to efficiently reach the area immediately below the magnetization-free layer, the magnetic sensing section may be formed such that the order of deposition of the magnetization-free layer, the non-magnetic layer, and the fixed magnetization layer is reversed in such a way as to arrange the magnetization-free layer to be close to the near field light generation section.

When the order of formation of the magnetic sensing section and the near field light source is reversed as above, the magnetic reproduction head 1002 of the magnetic reproducer 2001 of the twelfth embodiment may be arranged such that the direction of attaching the magnetic reproduction head 1002 to the suspension arm 603 is changed to the direction along the tracks, for the purpose of arranging the magnetic sensing section to be behind the area where the near field light is generated, in relation to the traveling direction of the magnetic recording medium 601.

In addition, in the eleventh embodiment, it is not always necessary to form the laser light source 401 on the same substrate as the magnetic sensor device 201. In this regard, in the case of a magnetic reproducer, for example, a laser light source is formed on a suspension arm supporting a magnetic reproduction head of the magnetic reproducer, and light beam is guided to the magnetic sensor device 201 by means of an optical waveguide.

Furthermore, the present invention may be adapted so that the output end of the optical waveguide is narrowed so that the light beam is applied only to an area very close to the near field light source. In the fifth to tenth embodiments, the tip of the optical waveguide whose output end is narrowed may be integrated with the dielectric layer. This prevents the light beam from irradiating the magnetic sensing section, thereby preventing the deterioration in the device characteristic due to excessive heating of the magnetic sensing section.

When the laser light source is not formed on the same substrate as the magnetic sensor device as above, the substrate may be made of AlTiC ($Al_2O_3 \cdot TiC$) used in typical magnetic heads.

In the first to twelfth embodiments, the surface of the magnetic reproduction head, which faces the magnetic recording medium, may be covered with a lubricant which is directly applied thereto or attached thereto as a film, for the purpose of preventing damages due to the contact with the magnetic recording medium.

In the first to twelfth embodiments, the magnetic layer formed on the side opposite to the near field light generation section with respect to the magnetic sensing section may be an insulating layer.

Figure 30:
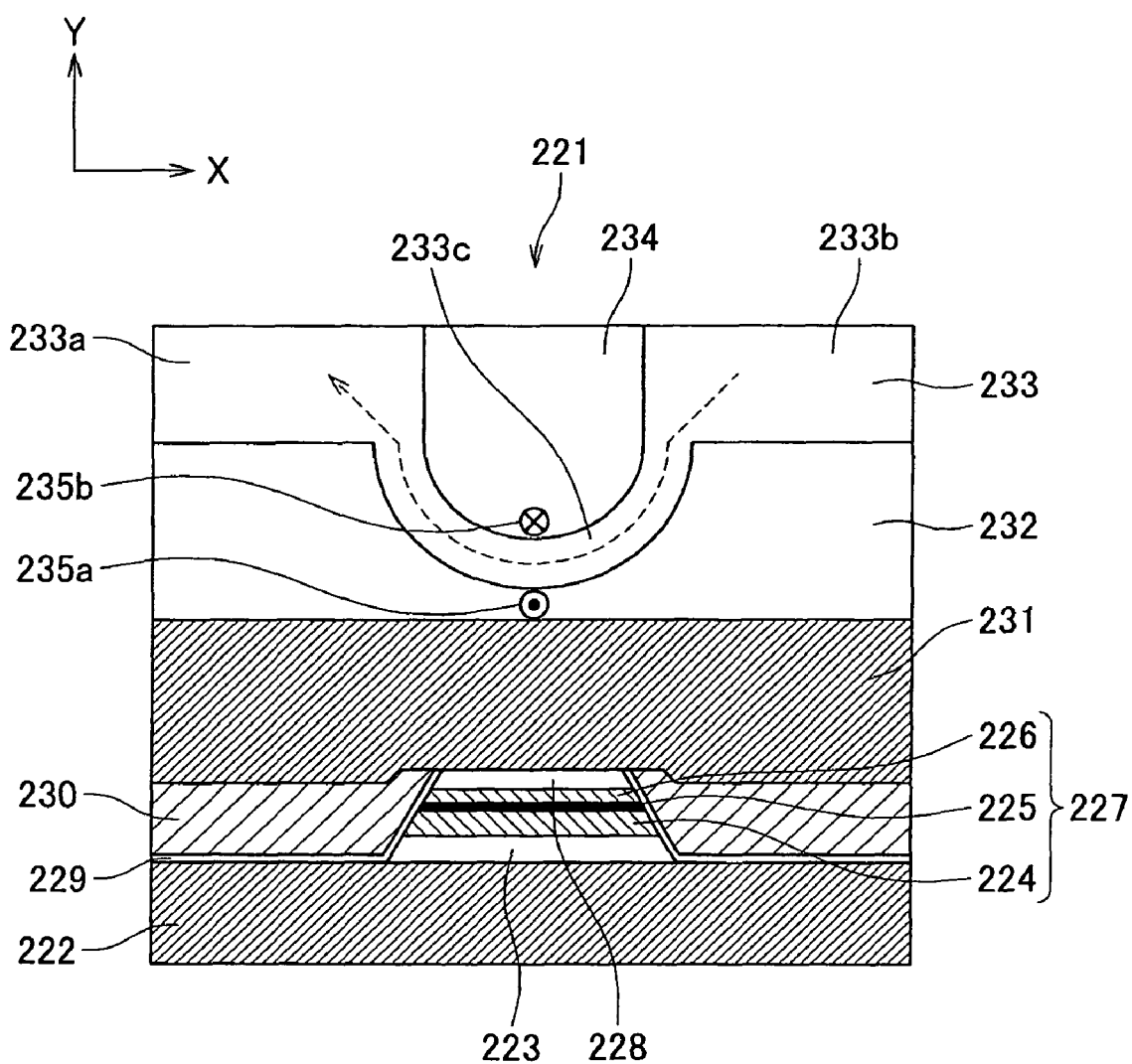
FIG. 30 is a partly-enlarged plan view of a substantial part of the magnetic recording reproduction device for photo-assisted magnetic recording of the referential embodiment of the present invention, viewed from the surface opposing a magnetic recording medium.

Now a magnetic recording reproduction device for photo-assisted magnetic recording of a referential embodiment is discussed. FIG. 30 is a partly-enlarged plan view of a substantial part of the magnetic recording reproduction device for photo-assisted magnetic recording of the referential embodiment, viewed from the surface opposing a magnetic recording medium. It is noted that members identical with the members 2 to 12 in the first embodiment are numbered as 222 to 232 and the descriptions thereof may be omitted. The substantial part of the magnetic recording reproduction device for photo-assisted magnetic recording of the referential embodiment is illustrated in the plan view in FIG. 30 in X-Y cross section.

The magnetic recording reproduction device 221 for photo-assisted magnetic recording of the referential embodiment is arranged to include a dielectric layer 232, a metal layer 233, and a dielectric layer 234 in place of the dielectric layer 12 and the metal layer 13 of the magnetic sensor device 1 of the first embodiment.

The metal layer 233 is made of a non-magnetic metal with high electric conductivity, such as Au, Pt, Ag, and Cu. The metal layer 233 includes electrodes 233a and 233b and a curved narrow part 233c which connects the electrodes with each other and has a convex portion and a concave portion corresponding to the convex portion. On the concave portion side of the narrow part 233c, a dielectric layer 234 is embedded to sandwich the narrow part 233c with the dielectric layer 232. The dielectric layer 232 and the dielectric layer 234 are made of the same material with the dielectric layer 12 of the first embodiment.

The metal layer 233 has the same convex portion as the narrow part of the photo-assisted magnetic recording electromagnetic field generating device disclosed in FIG. 3 of Japanese Unexamined Patent Publication No. 2004-303299. The photo-assisted magnetic recording electromagnetic field generating device recited in the document above generates near field light in such a way that laser light is applied to the narrow part made of metal with high electric conductivity such as Au, Pt, Ag, and Cu so that surface plasmons are excited at the convex portion of the narrow part. Simultaneously, an electric current is supplied to the narrow part. This functions as a magnetic field generation source and hence a magnetic field used for recording is generated from the narrow part. Adopting such a magnetic field generating device is preferable for a photo-assisted magnetic recording device using near field light, because near field light and a recording magnetic field are generated from a substantially same part.

Now, a principle of how near field light is generated in the magnetic recording reproduction device 221 is explained. A current (dotted arrow in FIG. 30) flows between the electrodes 233a and 233b, so that the current is confined at the narrow part 233c. At this moment, magnetic fields 235a and 235b are generated around the narrow part 233c on account of the right-handed screw rule. If the convex portion of the narrow part is adopted as the protruding section of the metal layer 13 of the first embodiment, highly intense near field light (not illustrated) enhanced by mutual interaction (multiple interference) between the narrow part 233c and the magnetic layer 231 is obtained in the same manner as the first embodiment, in response to the application of light beam (not illustrated) to around the narrow part 233c.

The arrangement above makes it possible to provide a magnetic recording reproduction device 221 which can realize, with a single laser light source, both photo-assisted magnetic recording and photo-assisted reproduction.

Furthermore, since the metal layer 233 of the magnetic recording reproduction device 221 is made of non-magnetic metal, no magnetic field is generated during no power supply, and the signal magnetic field detection by the magnetic sensing section 227 is not hindered by a residual magnetic field typically generated from a recording device made of a known magnetic material, even if the metal layer 233 is formed in the vicinity of the magnetic sensing section 227.

Furthermore, intense near field light enhanced at the tip of the convex portion of the narrow part 233c is obtained and photo-assisted magnetic recording and photo-assisted reproduction are simultaneously realized with improved efficiency compared to the past as in the case of the referential embodiment, even when the dielectric layer 232, the metal layer 233, and the dielectric layer 234 of the magnetic recording reproduction device 221 are appropriately altered in the second to fourth embodiments (for example, appropriately altered to a dielectric layer shaped to conform to the shape of the convex portion of the narrow part 233c, another metal layer, or a magnetic layer).

EXPLANATION OF REFERENCE NUMERALS 1, 21, 41, 61, 81, 101, 121, 141, 161, 181, 201 MAGNETIC SENSOR DEVICE
2, 11, 22, 31, 42, 51, 62, 71, 82, 91, 102, 111, 122, 131, 142, 151, 162, 171, 182, 191, 202, 211, 231 MAGNETIC LAYER
3, 8, 23, 28, 43, 48, 63, 68, 83, 88, 103, 108, 123, 128, 143, 148, 163, 168, 183, 188, 203, 208 BUFFER LAYER
4, 24, 44, 64, 84, 104, 124, 144, 164, 184, 204 FIXED MAGNETIZATION LAYER
5, 25, 45, 65, 85, 105, 125, 145, 165, 185, 205 NON-MAGNETIC LAYER
6, 26, 46, 66, 86, 106, 126, 146, 166, 186, 206 MAGNETIZATION-FREE LAYER
7, 27, 47, 67, 87, 107, 127, 147, 167, 187, 207, 227 MAGNETIC SENSING SECTION
9, 29, 49, 69, 89, 109, 129, 149, 169, 189, 209 NONCONDUCTOR LAYER
10, 30, 50, 70, 90, 110, 130, 150, 170, 190, 210 BIASING LAYER
12, 32, 52, 72, 92, 112, 132, 152, 172, 192, 212, 232, 234 DIELECTRIC LAYER
13, 33, 37, 53, 73, 77, 93, 113, 133, 137, 153, 157, 173, 193, 197, 213, 233 METAL LAYER
14, 34, 54, 74, 94, 114, 134, 154, 174, 194, 214 NEAR FIELD LIGHT GENERATION SECTION
15, 35, 55, 75, 95, 115, 135, 155, 175, 195, 215 LIGHT BEAM
16, 36, 56, 76, 96, 116, 136, 156, 176, 196, 216 NEAR FIELD LIGHT
17, 97, 301 SUBSTRATE
18, 98, 217 INSULATING LAYER
153a PROTRUDING SECTION
221 MAGNETIC RECORDING REPRODUCTION DEVICE
233a, 233b ELECTRODE
233c NARROW PART
235a MAGNETIC FIELD
302 ABS SECTION
402, 403 ELECTRODE LAYER
501 LIGHT-BLOCKING MEMBER
601 MAGNETIC RECORDING MEDIUM
602 SPINDLE

603 SUSPENSION ARM
604 VOICE COIL MOTOR
605 CONTROL CIRCUIT
606 ROTATION CONTROL UNIT
607 SIGNAL PROCESSING UNIT
608 OUTPUT CONTROL UNIT
609 MEMORY

The invention claimed is:

1. A magnetic sensor device comprising:
a near field light generation section in which a dielectric layer and a first metal layer are deposited in this order on a magnetic layer; and
a magnetic sensing section which is formed on a surface of the magnetic layer of the near field light generation section the surface facing away from the dielectric layer,
wherein the first metal layer has a protruding section which protrudes toward the magnetic layer, and
the first metal layer and the magnetic layer oppose each other with only the dielectric layer being interposed therebetween.

2. The magnetic sensor device according to claim 1, wherein, the first metal layer is made of Au, Ag, Al, or an alloy mainly of at least one of Au, Ag, and Al.

3. The magnetic sensor device according to claim 1, wherein, a distance between the magnetic layer and a tip of the protruding section of the first metal layer is not shorter than 5 nm and not longer than 100 nm.

4. The magnetic sensor device according to claim 1, wherein, a distance between the magnetic layer and a tip of the protruding section of the first metal layer is not shorter than 15 nm and not longer than 50 nm.

5. A magnetic reproduction head comprising:
a substrate having a surface on which the magnetic sensor device according to claim 1 is formed; and
an ABS section which is formed on a surface of the magnetic sensor device from which surface near field light is emitted.

6. The magnetic reproduction head according to claim 5, wherein,
a laser light source which is provided to generate the near field light in the magnetic sensor device is formed on the substrate.

7. The magnetic reproduction head according to claim 5, wherein,
at a part of an optical axis of a light beam applied to the magnetic sensor device on the substrate, a light-blocking member is provided to prevent the light beam from being applied to a magnetic sensing section of the magnetic sensor device.

8. A magnetic reproducer comprising: the magnetic reproduction head according to claim 5; and
a magnetic recording medium from which magnetic reproduction is performed by the magnetic reproduction head.

9. The magnetic reproducer according to claim 8, wherein,
the magnetic sensor device in the magnetic reproduction head is provided, in relation to a direction of movement of the magnetic recording medium, behind a part of the magnetic reproduction head from which part near field light is generated.

10. A magnetic reproducing method using the magnetic reproducer according to claim 8, comprising the steps of:
emitting near field light from the magnetic sensor device of the magnetic reproduction head;
forming a heated area on the magnetic recording medium by the near field light; and
detecting, by using the magnetic sensing section in the magnetic sensor device, a magnetic field generated from the heated area.

11. A magnetic sensor device comprising:
a near field light generation section in which a dielectric layer and a first metal layer are deposited in this order on a magnetic layer; and
a magnetic sensing section which is formed on a surface of the magnetic layer of the near field light generation section, the surface facing away from the dielectric layer,
wherein, the first metal layer has a protruding section which protrudes toward the magnetic layer, and
the magnetic layer has a concave shape along the protruding section of the first metal layer.

* * * * *